(12) United States Patent
Blake et al.

(10) Patent No.: US 10,604,252 B2
(45) Date of Patent: Mar. 31, 2020

(54) LANDING AND PAYLOAD LOADING STRUCTURES

(71) Applicant: Wing Aviation LLC, Mountain View, CA (US)

(72) Inventors: Jesse Blake, Sunnyvale, CA (US); Jim Schmalzried, San Jose, CA (US); Trevor Shannon, Mountain View, CA (US); Michael Simonian, San Francisco, CA (US); Sindre Klepp, San Francisco, CA (US); Stephen Benson, San Carlos, CA (US); Adam Woodworth, San Jose, CA (US)

(73) Assignee: Wing Aviation LLC, Mountain View, CA (US)

( * ) Notice: Subject to any disclaimer, the term of this patent is extended or adjusted under 35 U.S.C. 154(b) by 546 days.

(21) Appl. No.: 15/358,935

(22) Filed: Nov. 22, 2016

(65) Prior Publication Data
US 2018/0141682 A1 May 24, 2018

(51) Int. Cl.
*B64C 39/02* (2006.01)

(52) U.S. Cl.
CPC ...... *B64C 39/024* (2013.01); *B64C 2201/128* (2013.01); *B64C 2201/18* (2013.01)

(58) Field of Classification Search
CPC ........ B64C 2201/128; B64F 1/22; B64F 1/02; B64D 1/22; E01F 3/00
See application file for complete search history.

(56) References Cited

U.S. PATENT DOCUMENTS

| | | | |
|---|---|---|---|
| 6,019,314 A * | 2/2000 | Craig | B64F 1/12 114/261 |
| 6,056,237 A | 5/2000 | Woodland | |
| 6,567,044 B2 | 5/2003 | Carroll | |
| 6,817,573 B2 | 11/2004 | Harrison et al. | |
| 6,965,816 B2 | 11/2005 | Walker | |

(Continued)

FOREIGN PATENT DOCUMENTS

| | | |
|---|---|---|
| WO | 2012064891 A2 | 5/2012 |
| WO | 2013055265 A1 | 4/2013 |

OTHER PUBLICATIONS

Lum et al., "Telesurgery Via Unmanned Aerial Vehicle (UAV) with a Field Deployable Surgical Robot," Medicine Meets Virtual Reality 155, 2007, 313-315.

(Continued)

*Primary Examiner* — Philip J Bonzell
*Assistant Examiner* — Tye William Abell
(74) *Attorney, Agent, or Firm* — McDonnell Boehnen Hulbert & Berghoff LLP

(57) ABSTRACT

An example UAV landing structure includes a landing platform for a UAV, a cavity within the landing platform, and a track that runs along the landing platform and at least a part of the cavity. The UAV may include a winch system that includes a tether that may be coupled to a payload. Furthermore, the cavity may be aligned over a predetermined target location. The cavity may be sized to allow the winch system to pass a tethered payload through the cavity. The track may guide the UAV to a docked position over the cavity as the UAV moves along the landing platform. When the UAV is in the docked position, a payload may be loaded to or unloaded from the UAV through the cavity.

27 Claims, 17 Drawing Sheets

(56) References Cited

U.S. PATENT DOCUMENTS

| | | |
|---|---|---|
| 7,574,193 B2 | 8/2009 | Hulkkonen et al. |
| 7,813,888 B2 | 10/2010 | Vian et al. |
| 7,877,785 B2 | 1/2011 | Selignan |
| 8,028,952 B2 | 10/2011 | Umes, Sr. |
| 8,909,391 B1 | 12/2014 | Peeters et al. |
| 9,387,928 B1* | 7/2016 | Gentry .................. B64C 39/024 |
| 9,676,481 B1* | 6/2017 | Buchmueller ........... B64D 1/12 |
| 2005/0151014 A1 | 7/2005 | McGeer |
| 2006/0249622 A1 | 11/2006 | Steele |
| 2007/0049251 A1 | 3/2007 | Mock et al. |
| 2008/0085732 A1 | 4/2008 | Mizuide et al. |
| 2010/0084513 A1 | 4/2010 | Gariepy et al. |
| 2010/0256839 A1 | 10/2010 | Fitzpatrick |
| 2010/0280699 A1 | 11/2010 | Bageshwar et al. |
| 2011/0084162 A1 | 4/2011 | Goossen et al. |
| 2011/0128372 A1 | 6/2011 | Malecki et al. |
| 2011/0130636 A1 | 6/2011 | Daniel et al. |
| 2011/0281679 A1 | 11/2011 | Grimm et al. |
| 2011/0315806 A1 | 12/2011 | Piasecki et al. |
| 2012/0080556 A1 | 4/2012 | Root, Jr. |
| 2012/0152654 A1 | 6/2012 | Marcus |
| 2015/0063959 A1 | 3/2015 | Saad et al. |
| 2015/0175276 A1* | 6/2015 | Koster ..................... B64F 1/32 244/114 R |
| 2015/0217860 A1* | 8/2015 | Yang ....................... B64C 25/04 244/102 R |
| 2016/0001883 A1 | 1/2016 | Sanz et al. |
| 2016/0059963 A1 | 3/2016 | Burgess et al. |
| 2016/0144982 A1 | 5/2016 | Sugumaran |
| 2016/0257423 A1* | 9/2016 | Martin ..................... B64F 1/00 |
| 2017/0175413 A1* | 6/2017 | Curlander ............... E04H 14/00 |
| 2017/0313421 A1* | 11/2017 | Gil .......................... H04W 4/70 |

OTHER PUBLICATIONS

Nguyen et al., "Situation Identification by Unmanned Aerial Vehicle," Institute of Mathematics, 2001, 49-56.

Bone et al., "Unmanned Aerial Vehicles: Background and Issues for Congress," Report for Congress COngressional Research Service, 2003, 1-53.

International Searching Authority, International Search Report and Written Opinion dated May 31, 2018, issued in connection with International Patent Application No. PCT/US2017/057630, filed on Oct. 20, 2017, 19 pages.

* cited by examiner

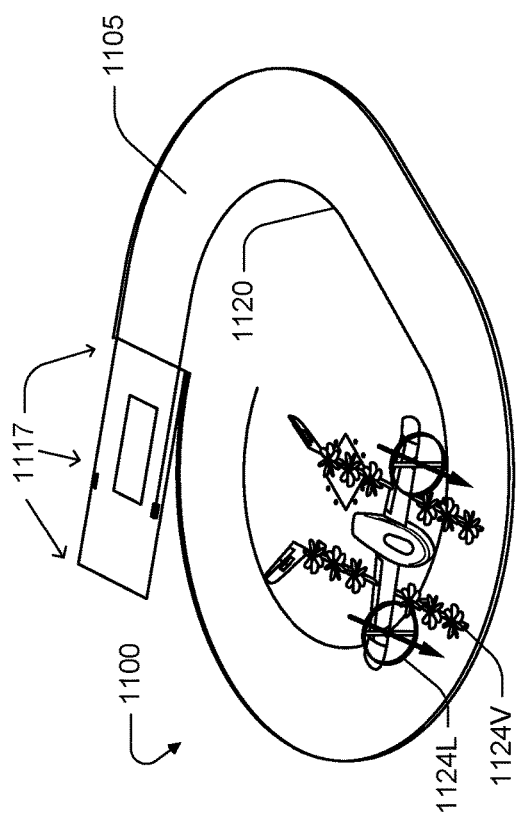
FIG. 11C
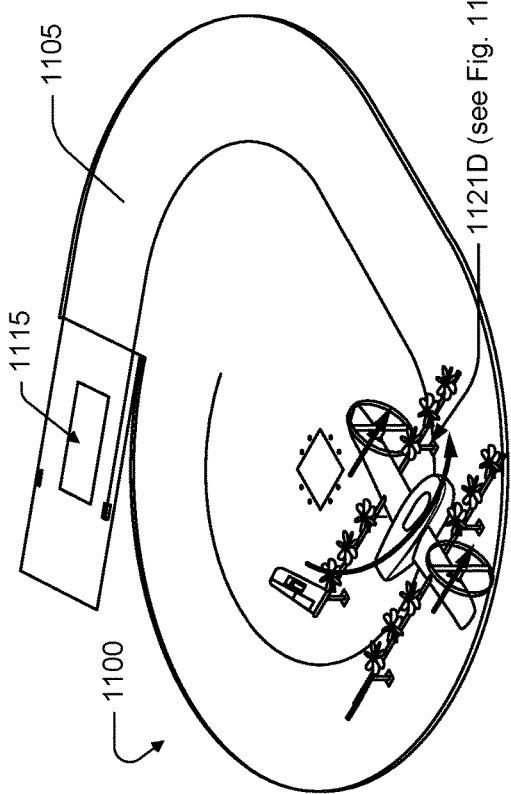
FIG. 11D
FIG. 11A
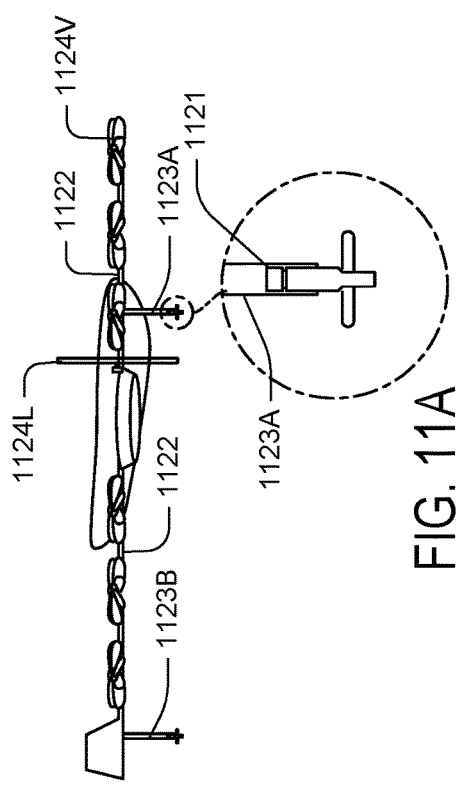
FIG. 11B
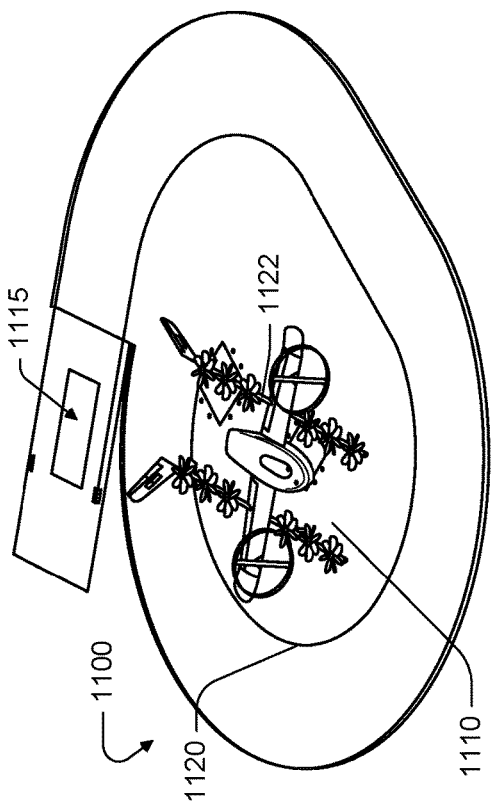

LANDING AND PAYLOAD LOADING STRUCTURES

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so concurrently. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible. Furthermore, unmanned vehicles may require physical landing structure(s) to pick up or drop off payload, to charge batteries, or to complete other tasks.

SUMMARY

The present application discloses implementations that relate to an unmanned aerial vehicle (UAV) landing structure. UAVs are increasingly more common and as such, dedicated landing structures are necessary to support UAV delivery services. For example, a structure with the capability to load and unload payloads from UAVs may help merchants looking to utilize UAV delivery services in their business. In order to facilitate delivery of payloads, a UAV may land on an elevated landing platform and lower a payload through a cavity in the platform. Additional devices or systems may be included within the landing structure in order to orientate the UAV or component(s) of the UAV such that the UAV can pick up or drop off a payload. For example, a track may be coupled to the landing platform in order to position the UAV over the cavity. In another example, a track may be coupled to the landing platform in order to align a tether of the UAV with a payload below the landing platform. Example landing structures described herein may be installed on freestanding support structures or may be installed on existing structures such as exterior building walls, rooftops, lamp posts, cell towers, etc. Beneficially, the landing structure(s) described herein may be installed in a variety of locations without impeding everyday life of merchants, customers, or other people, while increasing access to UAV delivery service to the same merchants, customers, or other people.

In at least one embodiment, a device is described. The device includes a landing platform for a UAV, a cavity within the landing platform, and a track that runs along the landing platform and at least a part of the cavity. The UAV includes a winch system that includes a tether that can be coupled to a payload. Furthermore, the cavity is aligned over a predetermined target location. Also, the cavity is sized to allow the winch system to pass a tethered payload through the cavity. Additionally, the track guides the UAV to a docked position in which the tether is positioned over the cavity. When the UAV is in the docked position, the tether can raise or lower a payload through the cavity.

In another embodiment, a system is described. The system includes a winch system for a UAV, and a landing platform. The winch system of the UAV includes a tether that can be coupled to a payload. Furthermore, the landing platform includes a cavity and a track that runs along the landing platform and at least a part of the cavity. Additionally, the cavity is aligned over a predetermined target location. The cavity is sized to allow the winch system to pass a tethered payload through the cavity. The track guides the UAV to a docked position over the cavity as the UAV moves along the landing platform. When the UAV is in the docked position, a payload may be loaded to or unloaded from the UAV through the cavity.

In yet another embodiment, a method is described. The method includes landing a UAV on a landing platform, the UAV engaging a track that runs along the landing platform including along at least a part of a cavity within the landing platform, the track guiding the UAV to a docked position over the cavity, and then loading or unloading a payload to or from the UAV through the cavity when the UAV is in the docked position. The UAV includes a winch system that includes a tether that can be coupled to a payload. Furthermore, the cavity is aligned over a predetermined target location and is sized to allow the winch system to pass a payload through the cavity.

In yet another aspect, another system is described. The system includes means for landing a UAV on a landing platform, means for engaging a track that runs along the landing platform including along at least a part of a cavity within the landing platform, means for guiding the UAV to a docked position over the cavity, and means for loading or unloading a payload to or from the UAV through the cavity when the UAV is in the docked position. The UAV includes a winch system that includes a tether that can be coupled to a payload. Furthermore, the cavity is aligned over a predetermined target location and is sized to allow the winch system to pass a tethered payload through the cavity.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 11A depicts a UAV landing and positioning over a cavity on a loading structure, according to an example embodiment.

FIG. 11B depicts a UAV landing and positioning over a cavity on a loading structure, according to an example embodiment.

FIG. 11C depicts a UAV landing and positioning over a cavity on a loading structure, according to an example embodiment.

FIG. 11D depicts a UAV landing and positioning over a cavity on a loading structure, according to an example embodiment.

DETAILED DESCRIPTION

Figure 1:
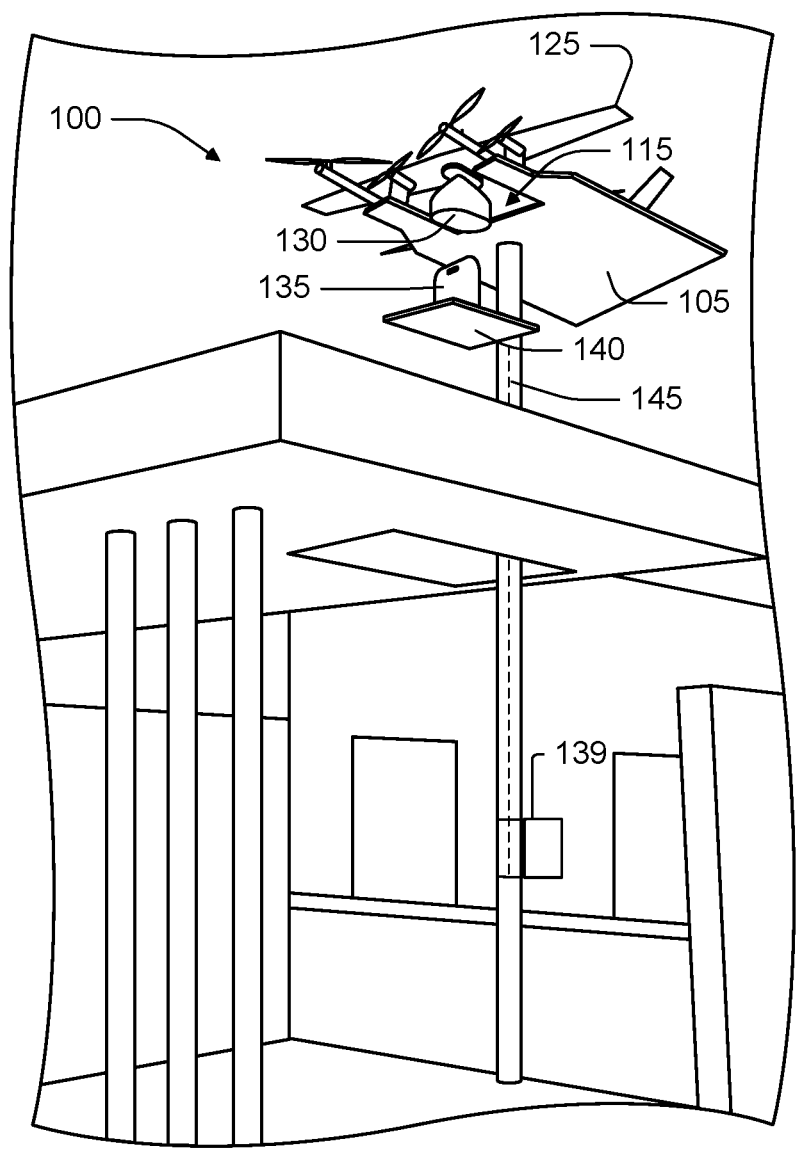
FIG. 1 depicts an unmanned aerial vehicle (UAV) on a loading structure, according to example embodiments.

Example devices, methods, and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

The present embodiments are related to a landing and loading structure (herein also called a "landing structure") for unmanned aerial vehicles (UAVs). Herein, the terms "unmanned aerial vehicle" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. In some aspects, UAVs may be capable of vertical take-off and/or landing, among other features. Further, the terms "drone," "unmanned aerial vehicle system" (UAVS), or "unmanned aerial system" (UAS) may also be used to refer to a UAV.

UAVs are increasingly being utilized to retrieve, carry, and deliver payloads across a variety of industries. As such, infrastructure is needed at both pickup and drop-off locations so that merchants, customers, and other users can utilize UAV delivery services. UAV landing structures may provide known, dedicated, and safe landing areas for one or more UAVs to land, pick up and/or drop off payloads. Furthermore, when the UAV is on the landing structure, the UAV may be able to complete a variety of other tasks such as recharging or replacing batteries and uploading or downloading information from a network, among others.

UAVs may be used to deliver or retrieve a payload to or from an individual or business (such as a restaurant delivering food to a customer at the customer's house). A merchant's place of business may include a landing structure for a UAV. The landing structure may include a predetermined target location that includes a payload for pick up. In other examples, the predetermined target location may include a platform or other part of the landing structure for the UAV to drop off a payload. As such, the target location may be identified to the UAV as a destination for a task such as a delivery pick up or drop off.

Within at least one example, a merchant may load a payload onto or inside a loading area of a landing structure at a ground level. The merchant may input details about the payload or the delivery on a user interface coupled to the structure at ground level. Upon arriving at the landing structure, a UAV may land on a landing platform above the loading area of the landing structure. Then components of the structure and/or the UAV may load the payload to the UAV for delivery. Loading the payload may include securing the payload to a tether of the UAV and possibly raising the payload up to the UAV.

After the payload is loaded, the UAV may then fly to another predetermined target location that may include another landing structure. Within examples, the predetermined target location may be at a specific location such as a customer's house, or near a location such as in a customer's neighborhood, so that the customer can pick up the payload from the UAV. Upon arriving at the predetermined target location, the UAV may land on a landing structure. The structure and/or the UAV may then transport the payload to a loading/unloading area of the structure at or near ground level so that the payload is easily accessible to the customer. As such, UAV landing and loading structure may provide new ways for merchants and customers to utilize UAV delivery services.

The landing structure may be permanent, may be freestanding, may be attached or integrated into existing structures (e.g. walls of buildings, lamp posts, cell towers, etc.), and/or may even be movable (such as a UAV landing structure attached to a truck). An example landing structure may include a landing platform located at a buffer distance above the average human height so that merchants, customers and other humans may be able to freely move around the landing structure without being obstructed or hindered by the landing platform or a UAV. Having the landing platform elevated the buffer distance above humans may prevent injury to humans and/or damage to UAVs or other structures. In other embodiments, the landing platform may be located a buffer distance away from human interaction. The buffer distance away from human interaction may include a horizontal and/or vertical distance such that people around the landing platform are kept a safe distance away from any UAVs landing or taking off. The buffer distance may also be considered a safety distance.

The landing platform may include a cavity within the platform in order for the UAV to interface with a payload. Further, the landing platform may include a track, or other alignment feature, that may position the UAV or a component of the UAV to a position over the cavity such that the UAV or the component of the UAV is aligned to pick up or drop off the payload. For example, the track may guide the UAV to a docked position over the cavity of the landing platform so that the UAV may load or unload the payload through the cavity.

If the UAV is not aligned properly over the cavity, the UAV may not be able to access the loading area or the payload below the landing platform. As such, the UAV may need to be orientated once it lands so that the UAV can be aligned over the cavity in a docked position. However, it may be difficult to control the orientation or alignment of the UAV with just the power of the UAV when the UAV lands on the landing platform. For example, using the UAV steering controls may not be precise enough to properly orientate the UAV on the landing platform such that the UAV can be loaded/unloaded. Additionally, using the UAV's controls while on the landing platform may risk damage to the UAV or the surroundings. Thus, having the track coupled to the landing platform in order to guide the UAV reduces the need for high precision steering and control of the UAV while the UAV is on the landing platform.

Beneficially, a UAV landing and loading structure may provide more people with access with UAV delivery services. Additionally, elevated landing platforms may reduce the risk of injury to humans. Moreover, inherent features of the landing structure may allow for installation of the landing structure on in a variety of locations without impeding everyday life of people around the landing structure.

II. Example UAV Landing and Payload Loading Infrastructures

Referring now to the figures, FIG. 1 illustrates a scene with a landing structure 100 installed at a merchant location (such as a restaurant or warehouse). FIG. 1 depicts the landing structure 100 near the front of a merchant location, such as outside the front doors of a restaurant. The landing structure 100 may include the landing platform 105, a payload platform 140, a user interface 139, and a vertical support structure 145. The payload platform 140 may carry a payload 135. Further, the landing platform 105 may include a cavity 115 and may be coupled to the vertical support structure 145 on a bottom of the landing platform 105. A UAV 125 is also shown landed or perched on the landing platform 105 in FIG. 1. The UAV 125 may include a winch system (not shown in FIG. 1) that comprises a tether (not shown in FIG. 1) that is coupleable to the payload 135. Within examples, the winch system may be positioned within the UAV 125 or attached to an underside of the UAV 125. The tether may be coupleable to the payload 135 by utilizing a payload coupling apparatus 130.

Moreover, the landing structure 100 at the merchant location may include a predetermined target location. The landing structure 100 may be known as a dedicated landing location for UAV 125 and other UAVs. More specifically, the predetermined target location may include the payload platform 140 within the landing structure 100. In other embodiments, a loading or unloading area that includes one or more payloads (such as payload 135) may be designated as the predetermined target location.

In one example, the payload 135 may be loaded on the payload platform 140 at a ground level that may be at or near the user interface 139. The ground level may be considered a height along the vertical support structure 145 that is easily accessible to a person standing on the ground, such as a height of three to five feet. At the ground level, the vertical support structure 145 of the landing structure 100 may include the user interface 139 for merchants, customers, or other UAV delivery service users. The user may input a variety of parameters or characteristics into a computer system of the landing structure 100 at the user interface 139. Such characteristics inputted on the user interface 139 may include details about the payload 135 like size, weight, and/or contents of the payload 135. Other characteristics that may be inputted on the user interface 139 may include delivery logistics, such as an address for a delivery site, time of delivery, or time of pick up, among others.

The payload 135 may travel vertically up and down the vertical support structure 145 on the payload platform 140 between the ground level and a loading level. The payload platform 140 may be movably coupled to the vertical support structure 145. The loading level may be a vertical height or level in which the payload 135 interfaces and/or couples to the payload coupling apparatus 130 of the UAV 125. In some embodiments, the loading level may be at or near the bottom of the landing platform 105. In other embodiments the loading level may a distance halfway or three-quarters up the vertical support structure 145. In yet even other embodiments, the loading level may be the same as the ground level and the payload platform 140 may remain stationary.

At the loading level, the payload 135 may be secured to a UAV 125 utilizing a payload coupling apparatus 130. The payload 135 may pass through the cavity 115 to the payload coupling apparatus 130. In other examples, the payload 135 and the payload coupling apparatus 130 may pass through the cavity 115 together. In such a case the payload coupling apparatus 130 may be attached to a first end of a tether and a second end of the tether may be attached to a winch system that is positioned within the UAV 125. The UAV 125 may lower and raise the payload coupling apparatus 130 vertically in order to reach and interface with the payload 135. As such, the cavity 115 may be sized to allow the winch system to pass a tethered payload 135 and/or the payload coupling apparatus 130 through the cavity 115.

The payload coupling apparatus 130 may include features such as a hook(s), a capsule, or a housing (or a combination thereof) that are configured to couple with the payload 135. The payload 135 may also include a handle or a hooking mechanism to interface with the payload coupling apparatus 130. The payload coupling apparatus may include other mechanical or electro-mechanical features.

The landing structure 100 may also include additional features such as an enclosure over all or a portion of the structure 100 to protect from weather related elements such as wind, rain, snow, or extreme temperatures. Within examples, an enclosure may provide temperature control to the payload 135 in a situation where the payload 135 may be sensitive to a temperature change. For example, the payload 135 may be a hot food delivery and the payload platform 140 may include a heated enclosure that keeps the payload 135 warm. The landing structure 100 may also include additional features such as railings or gates around the payload platform 140 that may prevent the payload 135 from falling to the ground if there was a wind gust or the contents of the payload 135 shifted.

In at least some examples, the landing structure 100 may be installed in a public, common area that may be a designated UAV delivery service drop-off and/or pickup location. In other examples, the landing structure 100 may be installed at a specific address. The location of such landing structures 100 may be known to a delivery system and to UAV 125. As such, locations of landing structures 100 may be considered known or predetermined target locations where users may interface with UAV 125 in order to pick up or drop off a package or other payload 135. In some examples, there may be a network of predetermined target locations throughout a geographic area that are known to the UAV 125.

Within examples, the landing platform 105, and more specifically the cavity 115, may be installed such that the cavity 115 is aligned over the predetermined target location. Thus, the UAV 125 may simply vertically raise or lower a payload 135 to or from the predetermined target location directly beneath the cavity 115. Furthermore, in some examples, the landing structure 100, and specifically the landing platform 105, may include navigational aids and the navigational aid may be configured to transmit a signal to the UAV. The navigation aids may provide final UAV 125 landing guidance and may include fiducial markings, lights, sounds, radio frequencies, among other signals.

The landing structure 100 may be part of a system. The system may include the UAV 125, the landing platform 105, and a control system. The control system may be located at the landing structure 100, within the UAV 125, or at a remote location, among other examples. The control system may be configured to complete tasks as part of a loading and/or unloading process. For example, the control system may be configured to instruct the UAV 125 to apply a symmetric forward thrust such that landing gear of the UAV contacts a track on the landing platform 105. The symmetric forward thrust of the UAV 125 may allow the UAV 125 to taxi along the landing platform 125 without any active steering by the UAV 125. The track may be considered a passive alignment feature, such as a raised track or slot built into the landing platform 105. In other aspects, the track may be considered an active alignment feature, such as a conveyor belt or series of conveyor belts. The track may guide the UAV 125 over the cavity 115.

Furthermore, the control system may instruct the instruct the UAV 125 to continue to apply the forward thrust until the UAV 125 reaches the docked position. The control system may also determine if the UAV 125 has reached the docked position, and then activate a winch system of the UAV 125 to lower a tether through the cavity 115. The tether may be coupled to the payload coupling apparatus 130 at a first end and the winch system at a second end. As such, the control system may instruct the winch system to lower the payload coupling apparatus 130 through the cavity 115 so the payload coupling apparatus 130 may be coupled to or decoupled from the payload 135. The control system may then determine that the tether has coupled to the payload 135 or that the tether has decoupled from the payload 135. Finally, the control system may then activate the winch system to raise the tether back through the cavity 115.

Figure 2B:
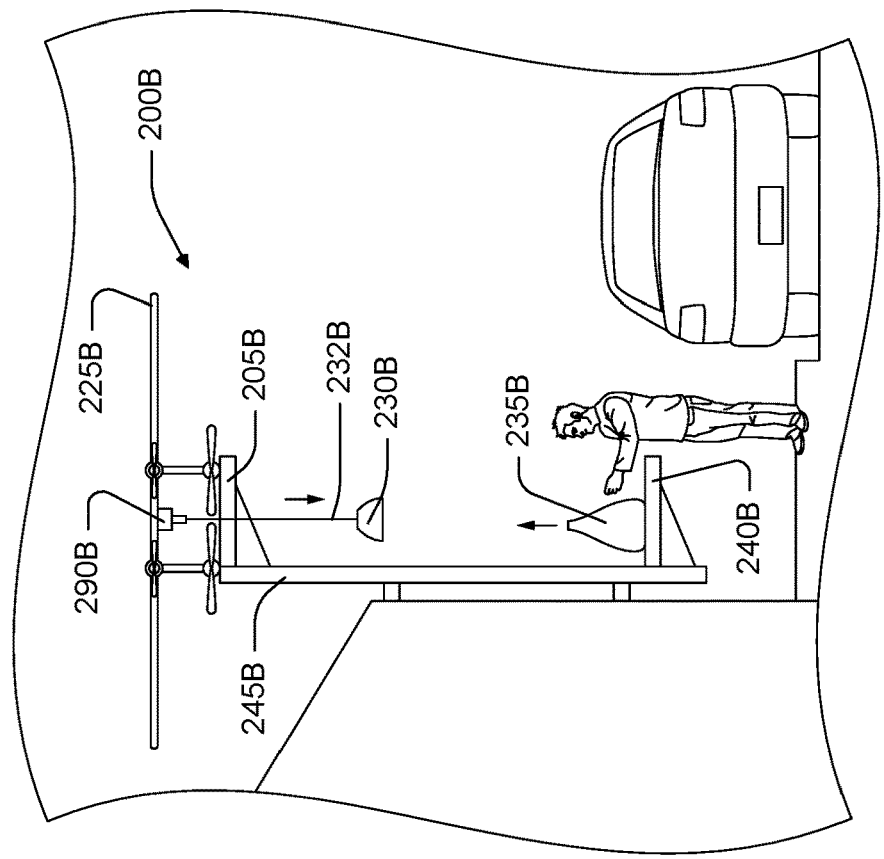
FIG. 2B depicts a UAV on a loading structure, according to example embodiment.
Figure 2A:
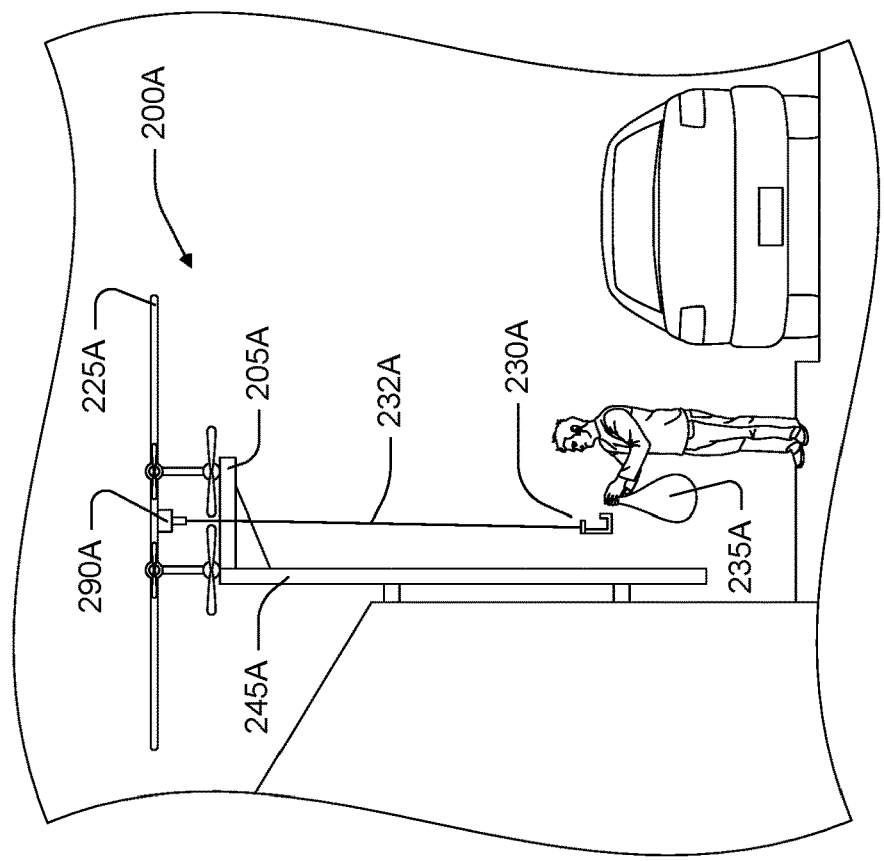
FIG. 2A depicts a UAV on a loading structure, according to example embodiment.

FIGS. 2A & 2B depict two additional scenes with other embodiments of landing structures 200A and 200B respectively. In FIG. 2A, the landing structure 200A may include a landing platform 205A and a vertical support structure 245A. A UAV 225A is also shown in FIG. 2A and includes a winch motor 290A, a tether 232A, and a payload coupling apparatus 230A. The elements and features of landing structure 200A may be the same or similar to the elements and features of landing structure 100 of FIG. 1.

In the scene depicted by FIG. 2A, the UAV 225A has landed on the landing platform 205A and has unwound the tether 232 from a winch system in the UAV 225A, thus lowering the payload coupling apparatus 230A near a ground level. The winch system in the UAV 225A may operate by utilizing the winch motor 290A to raise and lower the payload coupling apparatus 230A. At the ground level, a user may secure a payload 235A to the payload coupling apparatus 230A. In such an example, the ground level may be the same as a loading level. As shown in FIG. 2A, the payload coupling apparatus 230A may include a hook and the payload 235A may be a bag that has a handle that may be placed around the hook of the payload coupling apparatus 230A, thus securing the payload 235A to the payload coupling apparatus 230A.

In one example, after the payload 235A is secured, the winch motor 290A may wind the tether 232A thus raising the payload 235A and the payload coupling apparatus 230A up to the loading platform 205A. The winch motor 290A may continue to wind the tether 232A raising the payload 235A until the payload 235A has completely passed through a cavity (not shown in FIG. 2A) of the landing platform 205A.

Similarly, in another example, after the UAV 225A lands on the landing platform 205A, the winch motor 290A may unwind and extend the tether 232A vertically down towards the ground thus lowering the payload 235A. In such a case the landing structure 200A may include a predetermined target location, such as a specific location within a neighborhood, and the landing platform 205A, specifically the cavity (not shown) of the platform 205A, may be aligned above the predetermined target location. As such, a user expecting a delivery may arrive at the predetermined target location after being notified of the location. The user may then unload the payload 235A from the payload coupling apparatus 230A at ground level.

Also illustrated in FIG. 2A is the vertical support structure 245A. In this example, the vertical support structure 245A may be attached to an exterior wall of a building. In other embodiments the vertical support structure 245A may be free-standing. In yet other embodiments the vertical support structure 245A may be a city lamp post, a cell tower, or other structure.

In FIG. 2B, the landing structure 200B may include a landing platform 205B, a payload platform 240B and a vertical support structure 245B. A UAV 225B is also shown in FIG. 2B and includes a winch motor 290B, a tether 232B, and a payload coupling apparatus 230B. The elements and features of landing structure 200B may be the same or similar to the elements and features of landing structure 100 of FIG. 1 and landing structure 200A of FIG. 2A.

The embodiment illustrated in FIG. 2B, the UAV 225B has landed on the landing platform 205B and is lowering the payload coupling apparatus 235B utilizing the winch motor 290B to unwind the tether 232B. The payload coupling apparatus 235B may include a mechanism for opening and/or gripping a payload 235B. The payload 235B may be on the payload platform 240B and the payload platform 240B may be located under a cavity (not shown in FIG. 2B) of the landing platform 205B. The payload platform 240B may be movably coupled to the vertical support structure 245B such that the payload platform 240B may travel vertically between a ground level (e.g. a height a user may first place the payload 235B on the payload platform 240B) and a loading level. At the loading level the payload 235B may be secured to the UAV 225B utilizing the payload coupling apparatus 230B. As such, in at least some examples, the loading level may be at a greater height than the ground level.

In one aspect, the payload platform 240B may lift the payload 235B halfway up the vertical support structure 245B and may stop there. The payload coupling apparatus 230B may be lowered to the stopped payload 235B, couple to the payload 235B, and then raise the payload 235B up through the cavity (not shown) of the landing platform 205B. Other combinations of relative motion between the payload platform 240B and the payload coupling apparatus 230B may be possible.

Figure 3A:
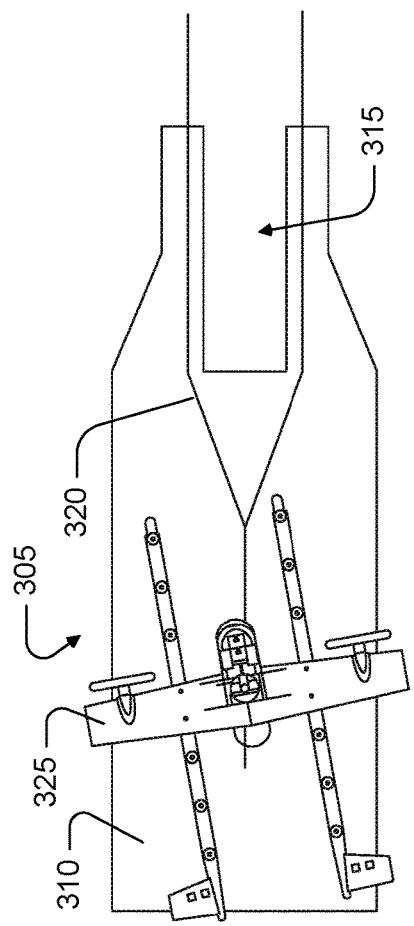
FIG. 3A depicts a UAV on a loading structure, according to an example embodiment.
Figure 3B:
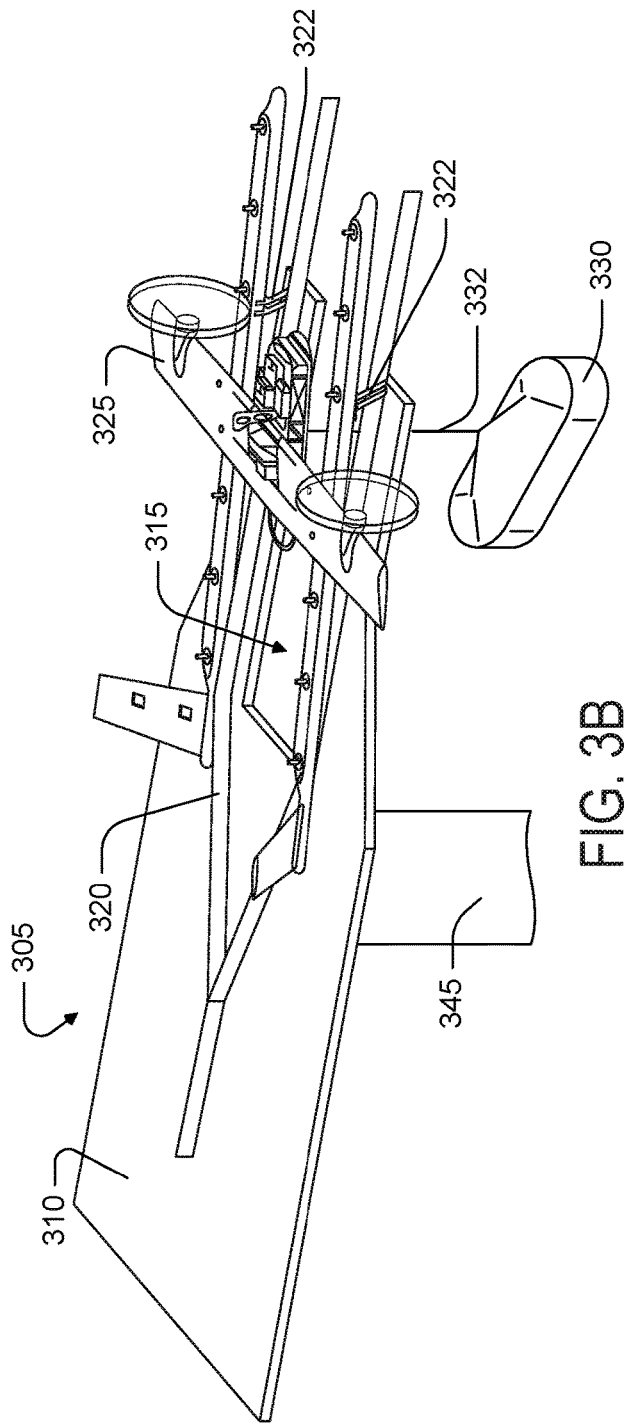
FIG. 3B depicts a UAV on a loading structure, according to an example embodiment.

One aspect depicted in FIGS. 2A and 2B is a height of the loading platforms 205A-B above a ground surface and above a user of the landing structures 200A-B. Within examples, a bottom(s) of the landing platform(s) 205A-B may be located a buffer distance above an average human height. By locating the landing platform(s) 205A-B the buffer distance above humans on the ground, the UAV(s) 225A-B maintain a safer distance away from humans on the ground. UAVs 225A-B may include rotors and other components that are heavy and move at a high rate of speed and as such may cause injuries to users or bystanders of the landing structures 200A-B. Thus, by maintaining the buffer distance above the average human height, the UAVs 225A-B may be safely kept away from humans on the ground. In some examples, the height of the bottom of the loading platform(s) 205A-B may be nine to fifteen feet above the ground surface. In other examples, the height of the bottom of the loading platform(s) 205A-B may be at the buffer distance between four and ten feet above the average human height such that the landing platforms 205A-B are approximately nine to fifteen feet above the ground surface. In even other embodiments, the landing platform(s) 205A-B may be located a buffer distance, or safety distance, away from human interaction. The buffer distance away from human interaction may be in a vertical and/or horizontal direction from the landing platform(s) 205A-B. Further, the buffer distance away from human interaction may include additional safety devices such as railings or walls that protect humans from UAVs 225A-B during landing or take-off FIGS. 3A and 3B illustrate an example embodiment of a loading platform 305. FIGS. 3A and 3B include the loading platform 305, a touchdown area 310, a cavity 315, a track 320, at least one stop block 322, a UAV 325, a payload coupling apparatus 330, a tether 332, and a vertical support structure 345. The elements and features of FIGS. 3A and 3B may be the same or similar to the elements and features within FIGS. 1, 2A, and 2B. For example, landing platform 305 may be the same or similar to landing platforms 105, 205A, and 205B of FIGS. 1, 2A, and 2B respectively.

FIG. 3A is a top view of the loading platform 305A in which the UAV 325 has landed in the touchdown area 310 of the loading platform 305. The touchdown area 310 may be a flat surface, or a primarily flat surface, that may have a larger footprint than the UAV 325. Within some embodiments, the touchdown area 310 may be horizontal, while in other embodiments the touchdown area 310 may be at an angle. Within some examples, the touchdown area 310 may be at an angle such that the down slope is in a direction towards the cavity 315. The touchdown area 310 may include lights, sensors, or produce other signals that may identify the touchdown area 310 of the landing platform 305 to the UAV 325.

The cavity 315 may provide access to an underside of the UAV 325 such that the UAV 325, or specifically the payload coupling apparatus 330 of the UAV 325, may couple with or decouple from a payload that the UAV 325 may be picking up or delivering. Further, the cavity 315 may be sized to allow the payload and the payload coupling apparatus 330 to fit through the cavity 315. As such, in order for the UAV 325 to either unload or load the payload, after the UAV 325 lands in the touchdown area 310, the UAV 325 may need to taxi or move towards the cavity 315 such that the payload may be loaded to or unloaded from an underside of the UAV 325. In order to facilitate proper loading or unloading operations features, it is important that the cavity 315, the payload coupling apparatus 330, and the payload are aligned along the same or nearly the same vertical axis.

Because the cavity 315 may be sized to fit the payload through the cavity 315, and because it may be important for the payload coupling apparatus 330 to align with the payload below, the UAV 325 may need to move to a specific location over the cavity 315. The specific location and/or the area around the cavity 315 may be considered a docked position. Within at least one embodiment, the UAV 325 may use its own power to travel along the landing platform 305 to the cavity 315. However, the landing platform 305 may be relatively narrow and it may become difficult and require precise steering (either by remote control from a user or by an autopilot system) in order to taxi the UAV 325 to the docked position over the cavity 315.

Furthermore, while the UAV 325 may have a desired orientation when it lands on the landing platform 305 (e.g. orientated in a direction such that the UAV 325 only needs to travel forward to go over the cavity 315 and reach the docked position), when the UAV 325 lands on the landing platform 305, the UAV 325 may in fact have an orientation different than the desired orientation. For example, as depicted in FIG. 3A, the UAV 325 may be at an angle to the cavity 315 of the landing platform 305 or the track 320. As such, the UAV 325 may engage the track 320 and the track 320 may guide the UAV 325 to a docked position over the cavity 315. Thus, the UAV 325 may only be required to apply symmetric or even forward thrust to reach the docked position.

In FIG. 3B the UAV 325 may be in the docked position over the cavity 315. The UAV 325 may have moved along the landing platform 305 being guided by the track 320 to the docked position. The docked position may represent a preferred location and orientation on the landing platform 305. While in the docked position over the cavity 315, the UAV 325 the payload may be loaded or unloaded from the UAV 325. Within some aspects, when the UAV is in the docked position the tether 332 may be positioned over the cavity such that the tether can raise or lower the payload through the cavity 315. Furthermore, while in the docked position, the UAV 325 may be able to exchange or charge batteries on board the UAV 325, among other tasks. Additionally, while in the docked position, mechanical restraints, such as clasps or flexible bands, may prevent the UAV 325 from moving or falling off the landing platform 325.

The track 320 may include a single or multiple pieces or portions. Within at least one example, for example as depicted in FIGS. 3A and 3B, the track 320 may include a straight portion of raised track that may be located on the landing platform 305 near the touchdown area 310. The track 320 may then include a tapered portion of raised track that begins at the straight portion and tapers out to edges of the cavity 315. Furthermore, the track 320 may also then include a cavity portion of track that runs alongside at least a part of the cavity 315. Within examples, the track 320 may be considered to have a "Y" shape. Other geometries of track 320 may be possible in order to guide the UAV 325 to the docked position. For example, a generally circular track 320 may be utilized depending on the size and shape of the landing platform 305 along with the location of the cavity 315 within the platform 305.

Within examples, the UAV 325, as depicted in FIG. 3A (i.e. at an angle to the cavity 315), may apply forward thrust, and a boom or other component of the UAV 325 may engage the track 320, and as a result the track 320 may turn and orientate the UAV 325 such that the track 325 may guide the UAV 325 to the docked position over the cavity 315. Engaging the track 320 may include a component such as the boom of the UAV 325 making contact with the track 320. Guiding the UAV 325 along the track may include turning the UAV 325 as it moves laterally along the landing platform 305 such that the UAV 325 achieves a desired directional heading over the cavity 315.

In some aspects, the track 320 may be a passive alignment feature. For example, the track 320 may be built into the platform 305 such that the track 320 acts as a physical barrier or obstacle that does not move. In other aspects, the track 320 may be an active alignment feature. For example, the track 320 may include a conveyor belt or a series of conveyor belts that guide the UAV 325 along the platform 305 over the cavity 315. Other examples of track 325 may be possible.

While the UAV 325 is thrusting forward it may be necessary to provide at least one stop block 322 to mechanically prevent the UAV 325 from traveling beyond the cavity 315. Within embodiments, for example as depicted in FIG. 3B, the at least one stop block 322 may engage or coming into contact with a component such as landing gear of the UAV 325 thus stopping the UAV 325 from continuing forward. The at least one stop block 322 may include features that prevent the UAV 325 from moving vertically as well. As such, features of the stop block 322 may prevent the UAV 325 from coming disengaged from the platform 305 by a gust of wind or other external force. Within one example, the at least one stop block 322 may include a top section that is configured to come into contact with the landing gear or another component of the UAV 325 if the UAV 325 experiences a gust of wind or other force in the vertical direction. Within other examples, the at least one stop block 322 may surround or capture at least a portion of the landing gear of the UAV 325. The at least one stop block 322 may be located at a distal end of the landing platform 305 near the cavity 315. Within examples, in order to disengage the at least one stop block, the UAV 325 may reverse thrust such that landing gear of the UAV 325 is no longer surrounded or captured by the at least one stop block 322.

III. Example Landing Structure Systems

Figure 4:
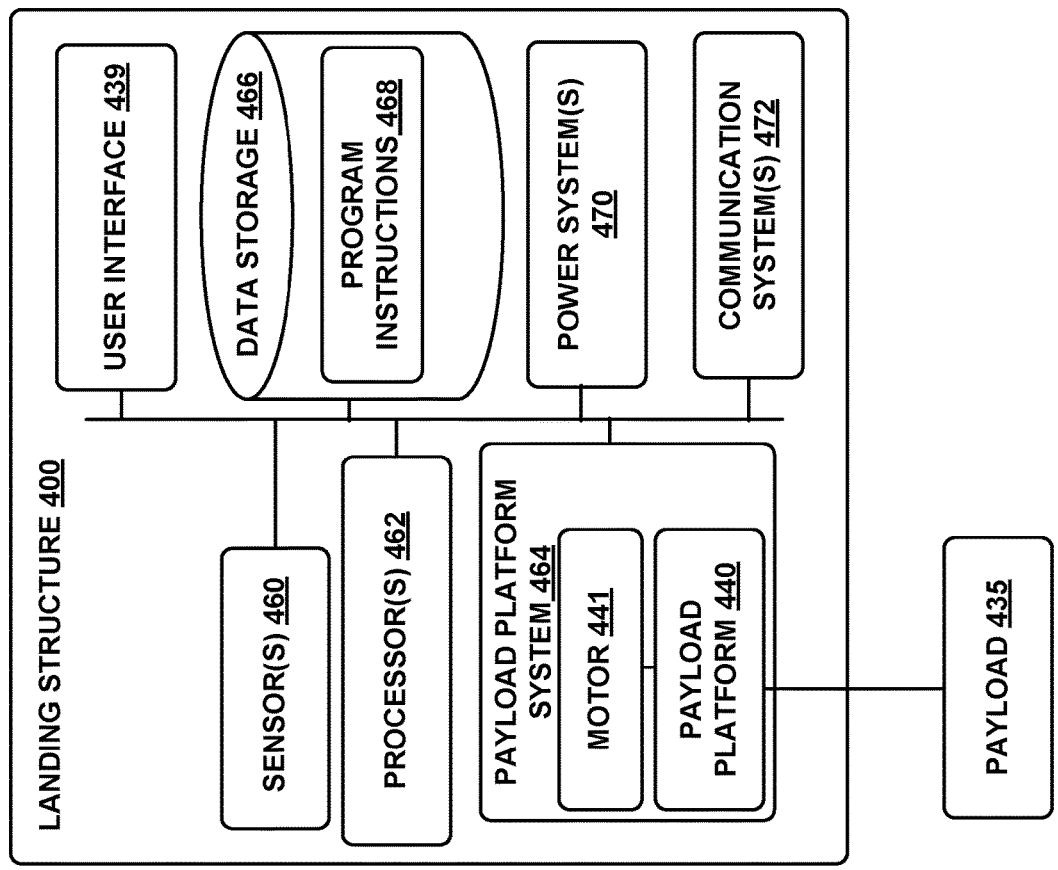
FIG. 4 is a simplified block diagram of a UAV system and a landing structure system, according to an example embodiment.

FIG. 4 is a simplified block diagram illustrating components of a landing structure 400. The landing structure 400 may include similar elements and features of landing structure 100, landing structure 200A-B, and landing platform 305 of FIGS. 1, 2A, 2B, 3A, and 3B respectively.

Landing structure 400 may include various types of sensors, and may include computing systems configured to provide the functionality described herein. The landing structure 400 may include sensors 460, such as sensors 460 to monitor a height of a payload platform or to monitor status of a UAV when the UAV lands on the landing structure 400.

In the illustrated embodiment, landing structure 400 also includes one or more processors 462. Processor 462 may be general-purpose processors or special purpose processors (e.g., digital signal processors, application specific integrated circuits, etc.). The one or more processors 462 can be configured to execute computer-readable program instructions 468, that are stored in data storage 466 and are executable to provide the functionality of a UAV and a landing structure described herein.

The data storage 466 may include or take the form of one or more computer-readable storage media that can be read or accessed by at least one processor 462. The one or more computer-readable storage media can include volatile and/or non-volatile storage components, such as optical, magnetic, organic or other memory or disc storage, which can be integrated in whole or in part with at least one of the one or more processors 462. In some embodiments, the data storage 466 can be implemented using a single physical device (e.g., one optical, magnetic, organic or other memory or disc storage unit), while in other embodiments, the data storage 466 can be implemented using two or more physical devices.

In a further aspect, the landing structure 400 may include one or more communication systems 472. The communication systems 472 may include one or more wireless interfaces and/or one or more wireline interfaces, which allow the landing structure 400 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, the landing structure 400 may include communication systems 472 that allow for both short-range communication and long-range communication. For example, the landing structure 400 may be configured for short-range communications using Bluetooth and for long-range communications under a CDMA protocol. In such an embodiment, the landing structure 400 may be configured to function as a "hot spot;" or in other words, as a gateway or proxy between a remote support device and one or more data networks, such as a cellular network and/or the Internet. Configured as such, the landing structure 400 may facilitate data communications that the remote support device would otherwise be unable to perform by itself.

For example, the landing structure 400 may provide a WiFi connection to a remote device, and serve as a proxy or gateway to a cellular service provider's data network, which the landing structure 400 might connect to under an LTE or a 3G protocol, for instance. The landing structure 400 may also serve as a proxy or gateway to a high-altitude balloon network, a satellite network, or a combination of these networks, among others, which a remote device might not be able to otherwise access.

In a further aspect, the landing structure 400 may include power system(s) 470. The power system 470 may include one or more batteries in addition to hardline connection to an electrical grid. In one example, the one or more batteries may be rechargeable and each battery may be recharged via a wired connection between the battery and a power supply and/or via a wireless charging system, such as an inductive charging system that applies an external time-varying magnetic field to an internal battery. In one aspect, extra batteries for the UAV may be stored and charged on the landing structure 400. As such, while the UAV is in a docked position on the landing structure 400, charged batteries from the landing structure 400 may replace depleted batteries of the UAV.

IV. Example Method for Loading and Unloading a UAV

Figure 5:
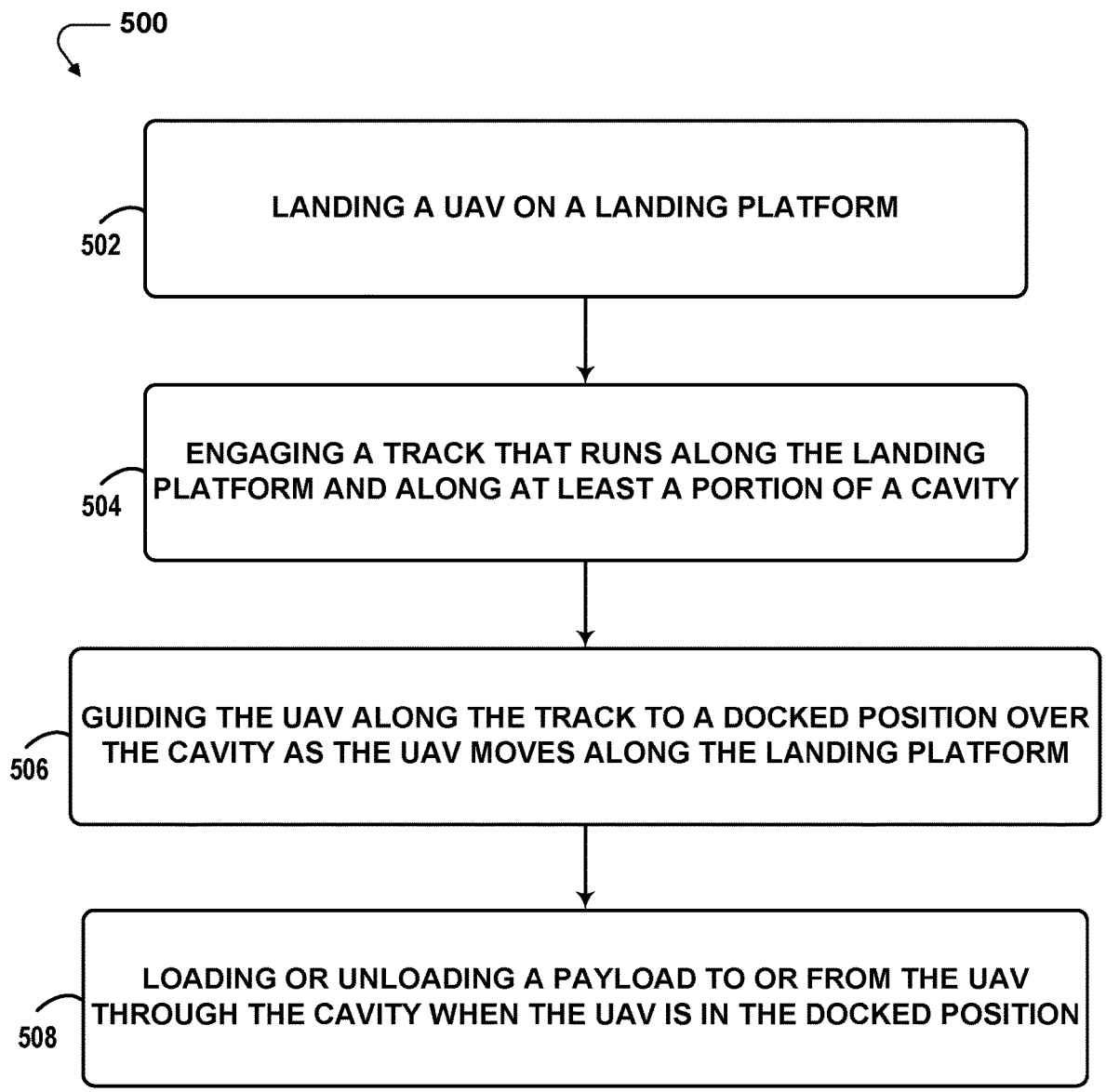
FIG. 5 is a flowchart for a method of loading/unloading payload from a UAV, according to an example embodiment.

FIG. 5 is a flowchart of an example method 500 for loading or unloading a UAV utilizing a landing structure. The method 500 may include one or more operations, functions, or actions, as depicted by one or more of blocks 502, 504, 506, and/or 508, each of which may be carried out by any of the devices or systems disclosed herein; however, other configurations could also be used.

Further, illustrative methods, such as method 500, may be carried out in whole or in part by a component(s) in a UAV landing structure system, such as one or more of the components in the UAV and landing structure systems illustrated in FIG. 4. It should be understood that example methods, such as method 500, might be carried out by entities, or combinations of entities (i.e., by other computing devices, robotic devices, and/or combinations thereof), without departing from the scope of the invention.

As shown by block 502, the method 500 includes landing, by a UAV, on a landing platform. The landing platform may include a cavity within the platform and a track. The track may include one or more portions of raised track or may also include a slot cut into the platform. A bottom of the landing platform may be located a buffer distance above an average human height. By maintaining the buffer distance between the average human height and the landing platform, a landing structure may be installed in a wide variety of locations while reducing physical interactions between the UAV and humans. Because the UAV may include heavy and/or rotating parts that may cause human injury or property damage, safely locating the landing platform up above existing structures may lower the risk of such human injury or property damage.

As shown by block 504, the method 500 further includes the UAV engaging the track. Engaging the track may include, after the UAV has landed in a touchdown area of the landing platform, the UAV using a symmetric forward thrust to taxi along the platform until a component of the UAV, such as a boom located under a wing of the UAV engages the track. The boom may engage the track by physically contacting the track.

Within examples, the track may run along the landing platform and along at least a portion of the cavity of the platform. Further, the cavity may be aligned over a predetermined target location. The predetermined target location may be an address or a location designated to receive a package or payload from the UAV. In some examples, the predetermined target location may include a specific component of the landing structure configured to store a payload. In other examples, the predetermined target location may include an address or location in which the UAV is to pick up a payload. The cavity is thus aligned over the target location so that the UAV can accurately pick up or drop off a payload while perched or landed up on the landing platform. Additionally, the cavity may be sized to allow a payload coupling apparatus of the UAV and the payload itself to be raised and lowered through the cavity.

As shown by block 506, the method 500 further includes guiding the UAV along the track to a docked position over the cavity. The track may passively guide the UAV by acting as a bumper or railing that the UAV may utilize in order to reach a preferred orientation and location on the platform over the cavity. For example, after engaging the track, the UAV continue a forward thrust to continue taxiing along the platform. The UAV, by only using a balanced forward lateral thrust may be steered by the track, that is, may be turned or oriented by the track, to the docked location over the cavity.

As shown by block 508, the method 500 may also include loading or unloading a payload to or from the UAV through the cavity while the UAV is in the docked position. Within examples, while the UAV is in the docked position, mechanical restraints or stop blocks or other mechanisms may hold the UAV in place for loading/unloading. Furthermore, while the UAV is in the docked position, the UAV may also exchange or replace parts or components of the UAV system such as batteries, or may couple to the landing platform or another component of the landing structure to charge or download/upload information from a server network.

The method 500 may include other steps or functions not shown in FIG. 5. For example, the method 500 may include transporting a payload from a ground level to a loading level by a payload platform. The payload platform may be configured to move vertically along a vertical support structure that is coupled to the landing platform. Furthermore, the payload platform may be aligned along a same vertical axis as the cavity of the landing platform to facilitate proper loading/unloading of the UAV.

The method 500 may also include a winch system positioned in the UAV moving the payload coupling apparatus vertically up or down to secure the payload. For example, the payload platform may move halfway up the vertical support structure in the direction of the landing platform and the winch system may unwind a tether attached to the payload coupling apparatus thus lowering the apparatus through the cavity and down from the landing platform to the location of the payload platform. The location at which the payload coupling apparatus may secure the payload may be considered the loading level of the landing structure.

V. Alternative Embodiments of a UAV Landing Infrastructure

Figure 6:
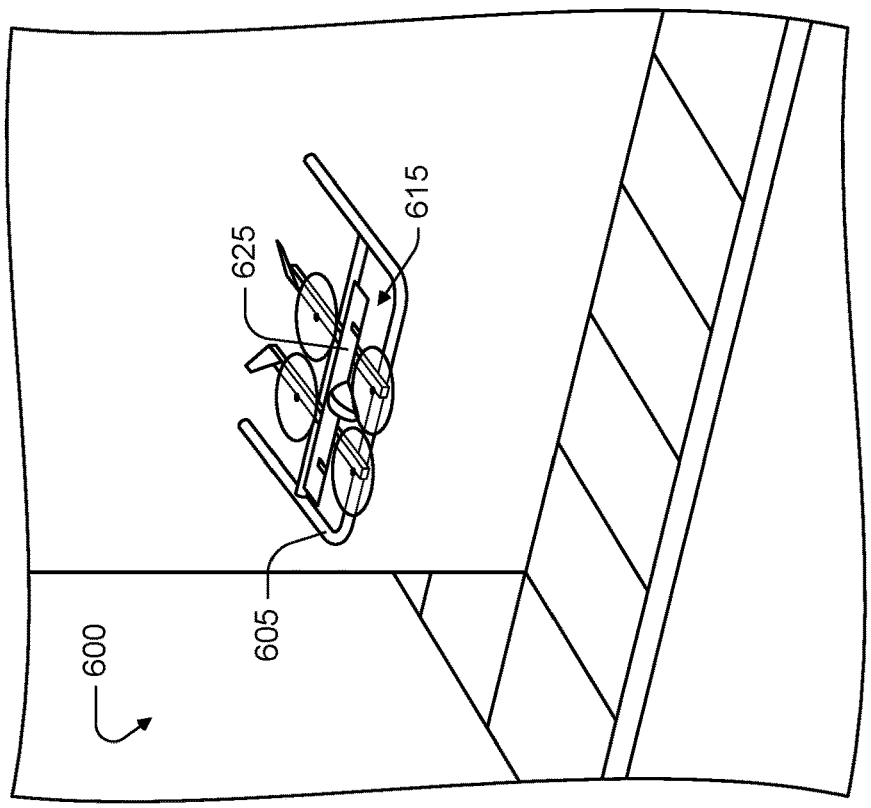
FIG. 6 depicts a UAV on a loading structure, according to an example embodiment.

FIG. 6 illustrates another embodiment of a landing structure 600. The landing structure 600 may include a landing platform 605 and a cavity 615. Further, the landing structure 600 may include similar elements and features of the landing structure 100, the landing structures 200A-B, landing platform 305, and landing structure 400 of FIGS. 1, 2A, 2B, 3A, 3B and 4 respectively.

Within examples, the landing platform 605 may be attached to an exterior wall of a building. As such, the landing platform 605 may be cantilevered off the wall of the building. In some aspects, the landing platform 605 may take up very little space and may be placed almost anywhere on the wall. As such, the landing platform 605 may give UAV delivery access or capacity to merchants or customers without interfering with existing structures or requiring much construction. Within examples, such as in FIG. 6, the landing platform 605 may include round aluminum or steel pipes or rods bent and welded to form the landing platform 605. In such an example a touchdown area of the platform may coincide with an area of the platform surrounding the cavity 615. Further, the touchdown area, or the area where the UAV 625 contacts and originally lands on the landing platform 605 may be angled and guide the UAV 625 into a docked position by utilizing gravitational forces.

Figure 7:
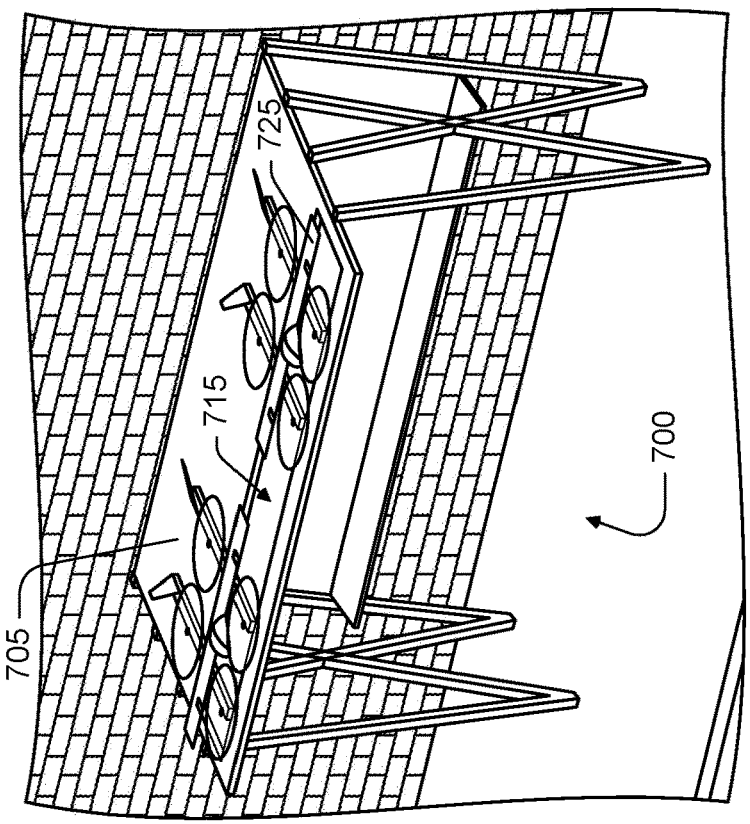
FIG. 7 depicts multiple UAVs on a loading structures, according to an example embodiment.

FIG. 7 illustrates yet another embodiment of a landing structure 700. The landing structure 700 may include a landing platform 705, a cavity 715, and vertical support structure 745. Further, the landing structure 700 may include similar elements and features of the landing structure 100, the landing structures 200A-B, landing platform 305, the landing structure 400, and the landing structure 600 of FIGS. 1, 2A, 2B, 3A, 3B, 4 and 6 respectively.

Within examples, the landing platform 705 may be large enough to hold or dock multiple UAVs 725 at the same time. Further, the cavity may also be large enough such that multiple UAVs 725 may be loaded or unloaded at the same time. As exemplified in FIG. 7, the landing structure 700 may be installed over a service window of a merchant's store or restaurant. As such, the merchant or customer may have easy access to payloads being dropped off or picked up by the UAVs 725.

Figure 8:
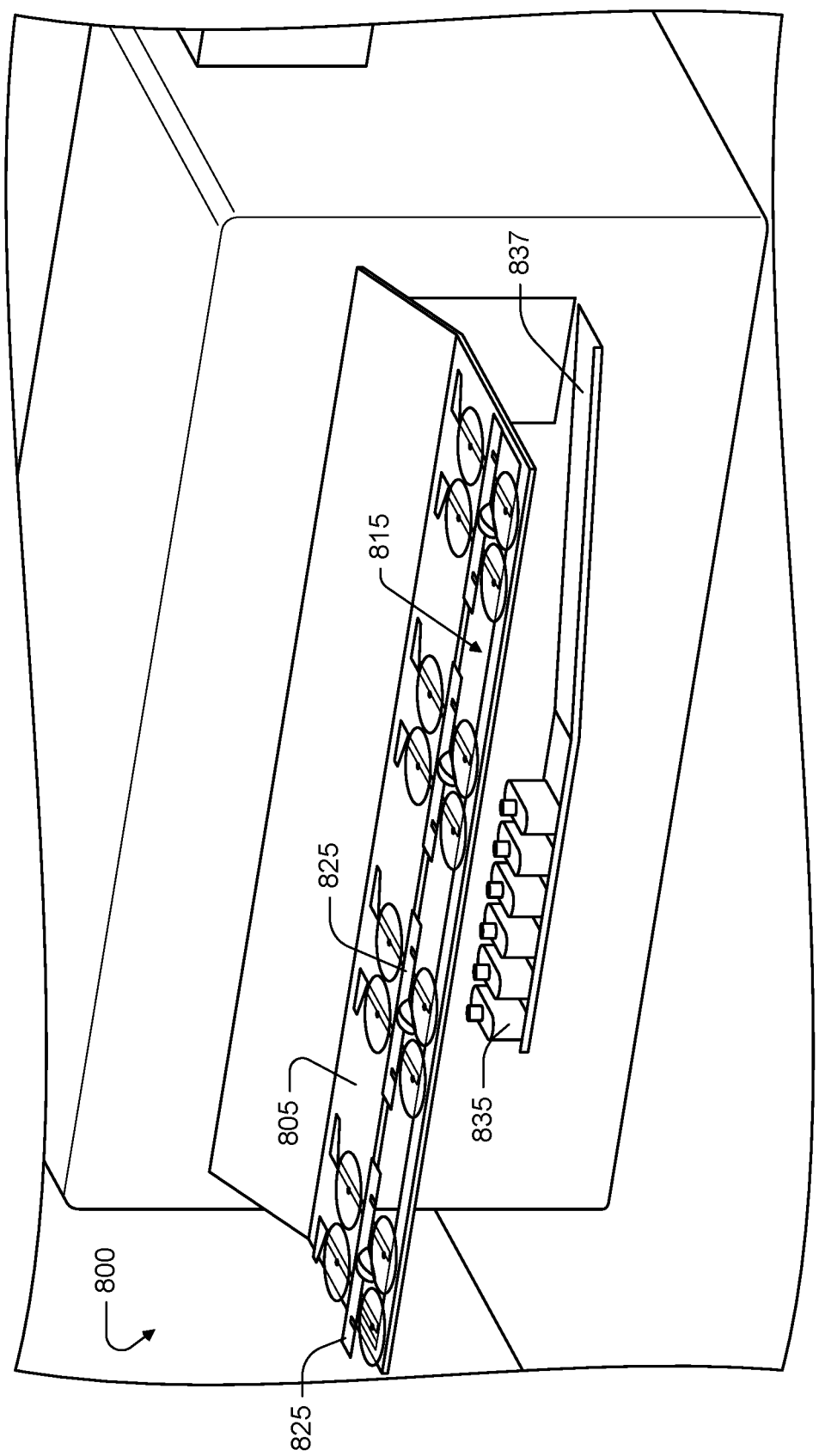
FIG. 8 depicts multiple UAVs on a loading structure, according to an example embodiment.

FIG. 8 illustrates another embodiment of a landing structure 800. The landing structure 800 may include a landing platform 805, a cavity 815, a plurality of payloads 835, and a payload alignment apparatus 837. Further, the landing structure 800 may include similar elements and features of the landing structures and platforms of FIGS. 1, 2A, 2B, 3A, 3B, 4, 6, and 7 respectively.

Within examples, the landing platform may be integrated into an awning attached to a building. In other examples the landing platform 805 may be integrated into umbrellas or rooftops or other existing structures. In some aspects, the landing platform 805 may be installed over a service window or station. A merchant may be able to place the payload 835 on a payload alignment apparatus 837 and the payload alignment apparatus 837 may align the payload 835 under the cavity 815 such that the payload 835 may be secured by the UAV 825. The payload alignment apparatus 837 may be installed under the landing platform 805 and may include a conveyor, a lift, or a slide configured to move the payload 835 to a pickup location that corresponds to a landing location on the landing platform 805 for a UAV 825.

Figure 9:
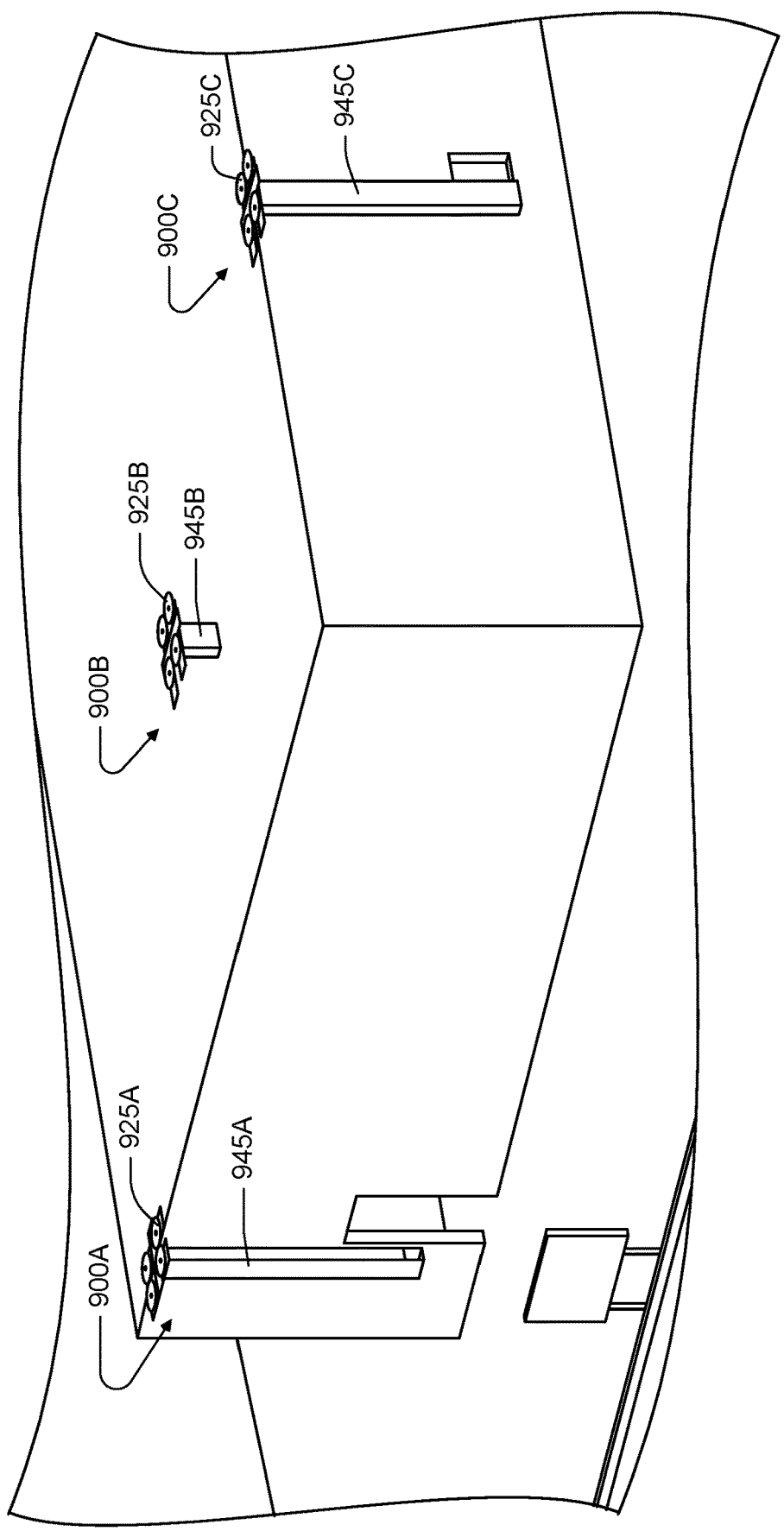
FIG. 9 depicts multiple UAVs on multiple loading structure, according to an example embodiment.

FIG. 9 illustrates another embodiment of multiple landing structures 900A-C installed on a single building. Each of the landing structures 900A-C may include a vertical support structure 945A-C, among other components. Further, the landing structures 900A-C may include similar elements and features of the landing structures and platforms of FIGS. 1, 2A, 2B, 3A, 3B, 4, 6, 7 and 8 respectively.

The building may be a restaurant or a warehouse and the UAVs 925A, 925B, and 925C may be accessible via multiple locations of the landing structures 900A-C. For example, the landing structure 900A may be next to a door or part of a door mount. As such, users may be able to drop off or pick up varying payloads as the users enter or exit the building. Representing another example, the landing structure 900B may be installed as part of or through a roof of the building. As such, the landing structure 900B may provide UAV delivery pickup/drop-off service to users inside the building, such as in a kitchen. For example, UAV 925B may deliver produce or other ingredients to cooks in a kitchen via vertical support structure 945B by landing on the landing structure 900B. In another example, the landing structure 900C may be near or coupled to a drive through window of the building. The vertical support structures 945A-C may include elevator platforms, conveyor platforms, or other types of known transportation means to lift or move payloads to/from the UAVs 925A-C from/to users below.

Figure 10:
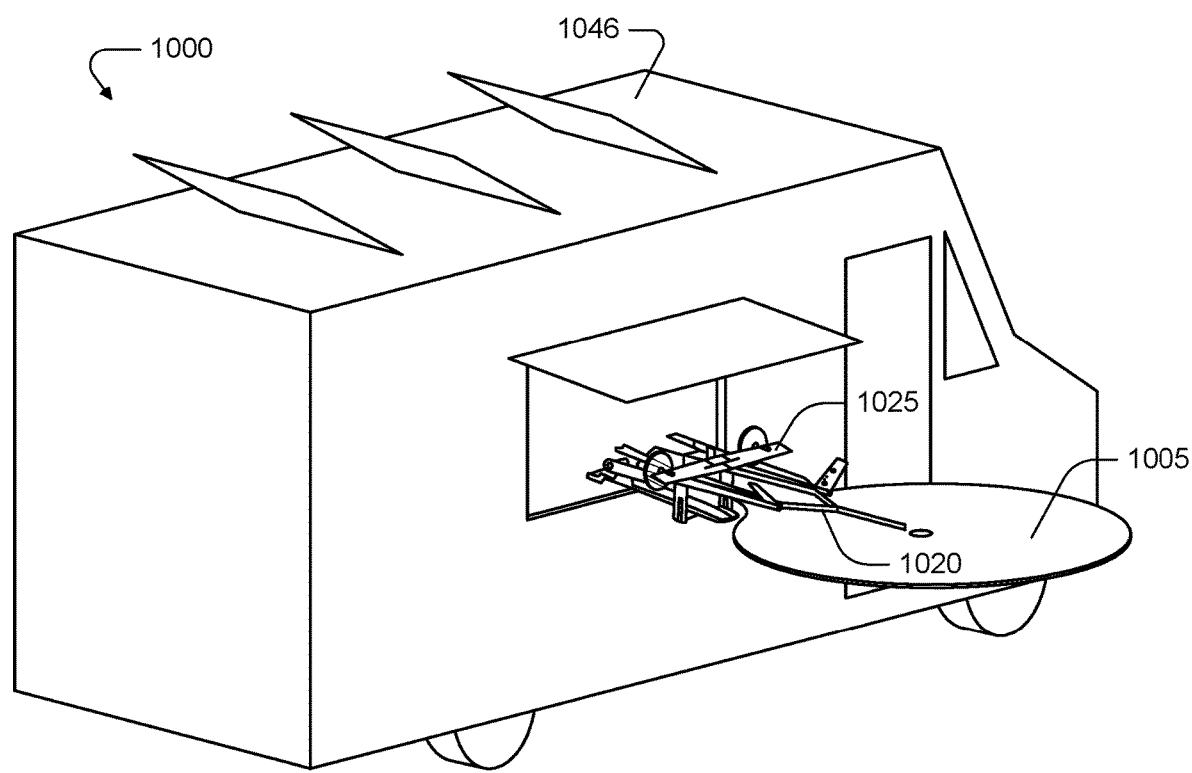
FIG. 10 depicts a UAV on a loading structure, according to an example embodiment.

FIG. 10 illustrates another embodiment of a landing structure 1000. The landing structure 1000 may include a landing platform 1005, a track 1020, and a vehicle 1046. Further, the landing structure 1000 may include similar elements and features of the landing structures and platforms of FIGS. 1, 2A, 2B, 3A, 3B, 4, 6, 7, 8 and 9 respectively.

The vehicle 1046 may be a van or truck such as a food truck that may use a UAV 1025. UAV 1025 may be used to deliver payloads including food to customers or may be used to drop off additional ingredients to cooks or employees inside the truck. In other embodiments, the vehicle 1046 may be a delivery truck or van capable of picking up or delivering packages via UAV 1025 as part of a larger delivery service network. For example, the vehicle 1046 may deliver packages to a neighborhood by driving to the neighborhood and then utilizing the UAV 1025 for delivery to specific addresses or locations.

In at least one aspect, the landing platform 1005 attached to the vehicle 1046 may not be located a buffer distance above an average human height. However, the landing structure 1000 may include other safety features such as a railing, cage, or other enclosure that may be included around the outer edges of the landing platform 1005 to protect humans from injury while the UAV 1025 is landing or taking-off from platform 1005. Such an enclosure may extend from the landing platform 1005 up to at least a buffer distance above the average human height. Within such an example, the UAV 1025 may land and take off vertically through the enclosure. In other aspects, other safety features such as an extendable awning that may cover the UAV 1025 while the UAV 1025 is on the platform may be included as part of the landing structure 1000. In another example, additional safety features may be included within an interior of the vehicle 1046 so that people inside the vehicle who may or may not interact with the UAV 1025 are protected.

VI. Further Embodiments of a UAV Landing Structure with Passive Positioning

FIGS. 11A-G depict another embodiment of a landing structure 1100. Specifically, FIGS. 11B-11G illustrate a UAV 1125 landing and taxiing to a docking station 1117. The landing structure 1100 may include a landing platform 1105, a touchdown area 1110, a cavity 1115, the docking station 1117, and a track 1120. Within examples the touchdown area 1110 may be a preferred landing location for the UAV 1125. The touchdown area 1110 may be surrounded or at least somewhat surrounded by a track 1120. The track 1120 may be a slot 1120 in the landing platform 1105 within FIGS. 11B-G. The slot 1120 may be cut into a surface of the landing platform 1105. Further, the landing structure 1100 may include similar elements and features of the landing structures and platforms of FIGS. 1, 2A, 2B, 3A, 3B, 4, 6, 7, 8, 9, and 10 respectively, that may or may not be shown in FIGS. 11A-G.

As depicted in FIG. 11A, the UAV 1125 may include at least one boom 1122. The boom 1122 may couple to a wing of the UAV 1125. Further, the boom 1122 may include two landing supports 1123A-B. Each of the landing supports 1123A-B may be a pad, a leg, a wheel or another type of landing gear that may support the UAV 1125 when it touches down and lands on the landing platform 1105. The UAV 1125 may include vertical propellers 1124V that may provide vertical thrust as well as lateral propellers 1124L that may provide lateral thrust. Within at least one example, there may be six vertical propellers 1124V coupled to the boom 1122.

Figure 11F:
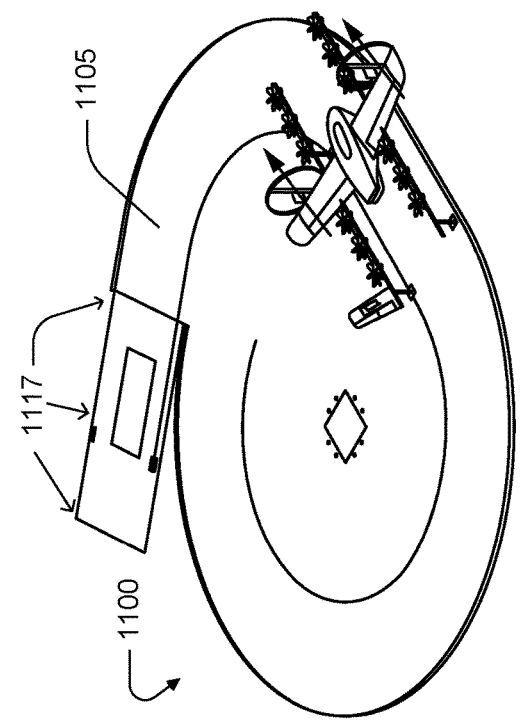
FIG. 11F depicts a UAV landing and positioning over a cavity on a loading structure, according to an example embodiment.

Further, as shown in FIG. 11A, each of the landing supports 1123A-B may include a pin 1121 that extends beyond the landing support 1123. In some aspects, pins 1121 may only be within landing supports 1123A-B on one side of the UAV 1125. So for example, in FIGS. 11B-11G, the pins 1121 are only in the landing supports 1123A-B on the left hand side of the UAV 1125. Within some examples, the pin 1121 may be coupled to a spring within the landing support 1123 so that the pin 1121 may retract or extend from the landing support 1123.

As shown in FIG. 11B, the UAV 1125 may land or touchdown on the landing platform 1105. More specifically, the UAV 1125 may land in a touchdown area 1110 that may be near a middle of the landing platform 1105.

As shown in FIG. 11C, the UAV 1125 may use forward thrust to propel the UAV 1125 towards the slot 1120. Because the touchdown area 1110 may be surrounded by the slot 1120, no matter the orientation of the UAV 1125 when it lands, the UAV 1125 only needs to thrust forward, without any steering control or feedback, to move laterally towards the slot 1120. In some aspects, even or symmetric thrust may be applied to the lateral propellers 1124L in order to move the UAV 1125 laterally along the landing platform 1105.

As shown in FIG. 11D, once the UAV 1125 reaches the slot 1120, the pin 1121D of the front landing support 1123A may engage the slot 1120. Marker 1121D provides an example location where the pin 1121 of the front landing support 1123A enters and engages the slot 1120. The pin 1121 may engage the slot 1120 by dropping or extending down into the slot 1120, thus limiting the lateral movement of the UAV 1125. So as the UAV 1125 continues the symmetric forward thrust, the UAV 1125 will begin to rotate about the pin 1121 in the front landing support 1123A. For example, as shown in FIG. 11D, the UAV 1125 may be forced to turn towards the docking station 1117 because the pin 1121 has engaged in the slot 1120.

Figure 11E:
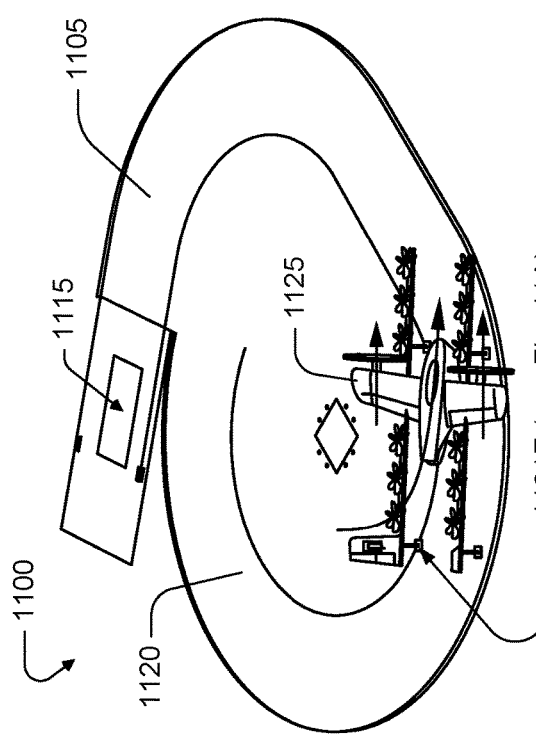
FIG. 11E depicts a UAV landing and positioning over a cavity on a loading structure, according to an example embodiment.

As shown in FIG. 11E, as the UAV 1125 continues the forward thrust the UAV 1125 has turned or rotated about the front landing support such that the pin 1121 of the back landing support 1123B may now engage the slot 1120 similar to how the pin 1121 of the front landing support 1123A did. Marker 1121E shows the position at which the pin 1121 within the back landing support 1123B reaches and engages the slot 1120. The UAV 1125 may now have two pins 1121 engaged in the slot 1120.

As shown in FIG. 11F, with two pins 1121 engaged in the slot, as the UAV 1125 continues to thrust forward, the slot 1120 guides the UAV 1125 along the landing platform 1105 towards the docking station 1117. In other words, the slot 1120 steers the UAV 1125 towards the docking station 1117.

Figure 11G:
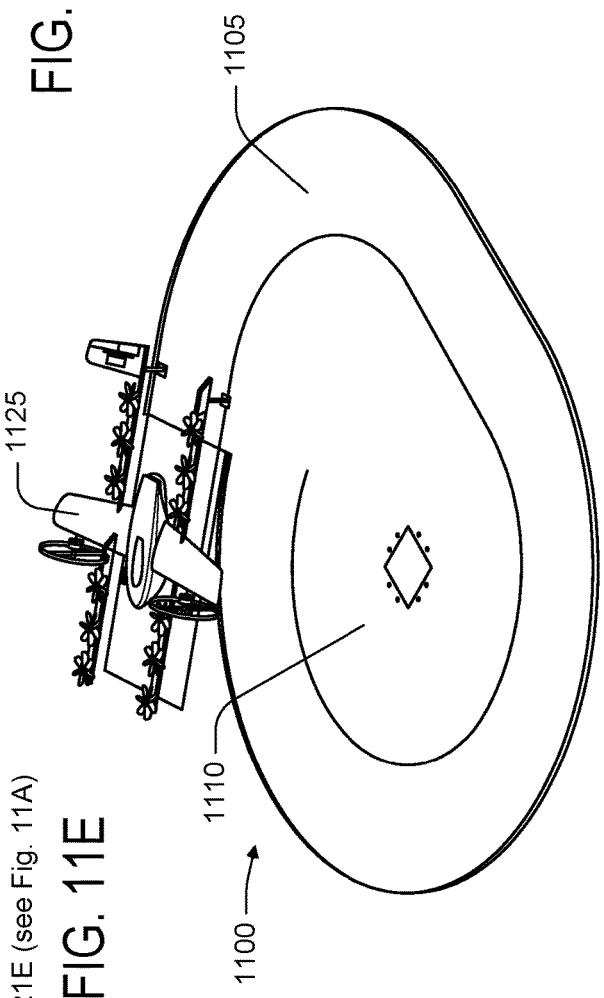
FIG. 11G depicts a UAV landing and positioning over a cavity on a loading structure, according to an example embodiment.

Finally, as shown in FIG. 11G, the UAV 1125 is positioned over the cavity 1105 in the docking station 1117. The docking station 1117 may be considered a location in which the UAV 1125 is in a docked position and as such the UAV 1125 may be loaded/unloaded while in the docking station 1117. The UAV 1125 was only required to provide symmetric forward thrust while the slot 1120 guided the UAV 1125 as the UAV 1125 taxied along the landing platform 1105.

VII. Illustrative Unmanned Vehicles

Figure 12A:
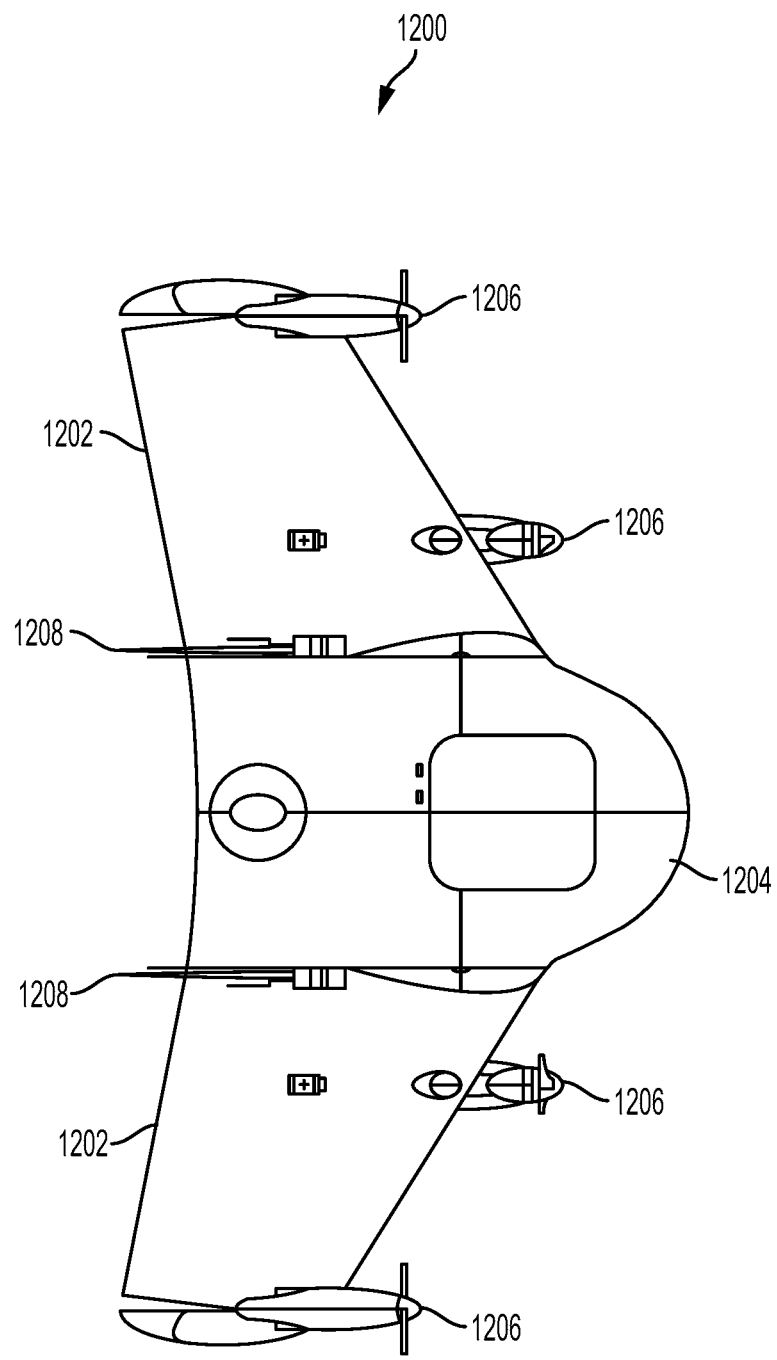
FIG. 12A is a simplified illustration of A UAV, according to an example embodiment.

FIG. 12A is a simplified illustration providing a top-down view of a UAV, according to an example embodiment. In particular, FIG. 12A shows an example of a fixed-wing UAV 1200, which may also be referred to as an airplane, an aeroplane, a biplane, a glider, or a plane, among other possibilities. The fixed-wing UAV 1200, as the name implies, has stationary wings 1202 that generate lift based on the wing shape and the vehicle's forward airspeed. For instance, the two wings 1202 may have an airfoil-shaped cross section to produce an aerodynamic force on the UAV 1200.

As depicted, the fixed-wing UAV 1200 may include a wing body 1204 rather than a clearly defined fuselage. The wing body 1204 may contain, for example, control electronics such as an inertial measurement unit (IMU) and/or an electronic speed controller, batteries, other sensors, and/or a payload, among other possibilities. The illustrative UAV 1200 may also include landing gear (not shown) to assist with controlled take-offs and landings. In other embodiments, other types of UAVs without landing gear are also possible.

The UAV 1200 further includes propulsion units 1206, which can each include a motor, shaft, and propeller, for propelling the UAV 1200. Vertical stabilizers 1208 (or fins) may also be attached to the wing body 1204 and/or the wings 1202 to stabilize the UAV's yaw (turn left or right) during flight. In some embodiments, the UAV 1200 may be also be configured to function as a glider. To do so, UAV 1200 may power off its motor, propulsion units, etc., and glide for a period of time.

During flight, the UAV 1200 may control the direction and/or speed of its movement by controlling its pitch, roll, yaw, and/or altitude. For example, the vertical stabilizers 1208 may include one or more rudders for controlling the UAV's yaw, and the wings 1202 may include one or more elevators for controlling the UAV's pitch and/or one or more ailerons for controlling the UAV's roll. As another example, increasing or decreasing the speed of all the propellers simultaneously can result in the UAV 1200 increasing or decreasing its altitude, respectively.

Figure 12B:
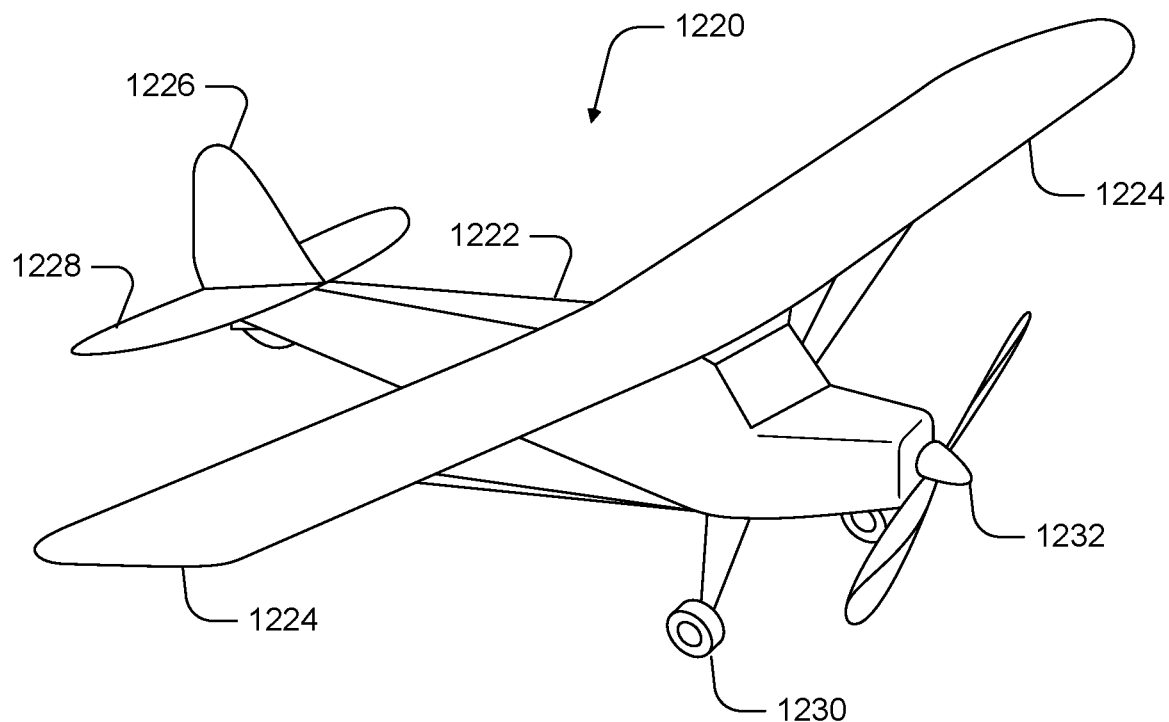
FIG. 12B is a simplified illustration of a UAV, according to an example embodiment.

Similarly, FIG. 12B shows another example of a fixed-wing UAV 1220. The fixed-wing UAV 1220 includes a fuselage 1222, two wings 1224 with an airfoil-shaped cross section to provide lift for the UAV 1220, a vertical stabilizer 1226 (or fin) to stabilize the plane's yaw (turn left or right), a horizontal stabilizer 1228 (also referred to as an elevator or tailplane) to stabilize pitch (tilt up or down), landing gear 1230, and a propulsion unit 1232, which can include a motor, shaft, and propeller.

Figure 12C:
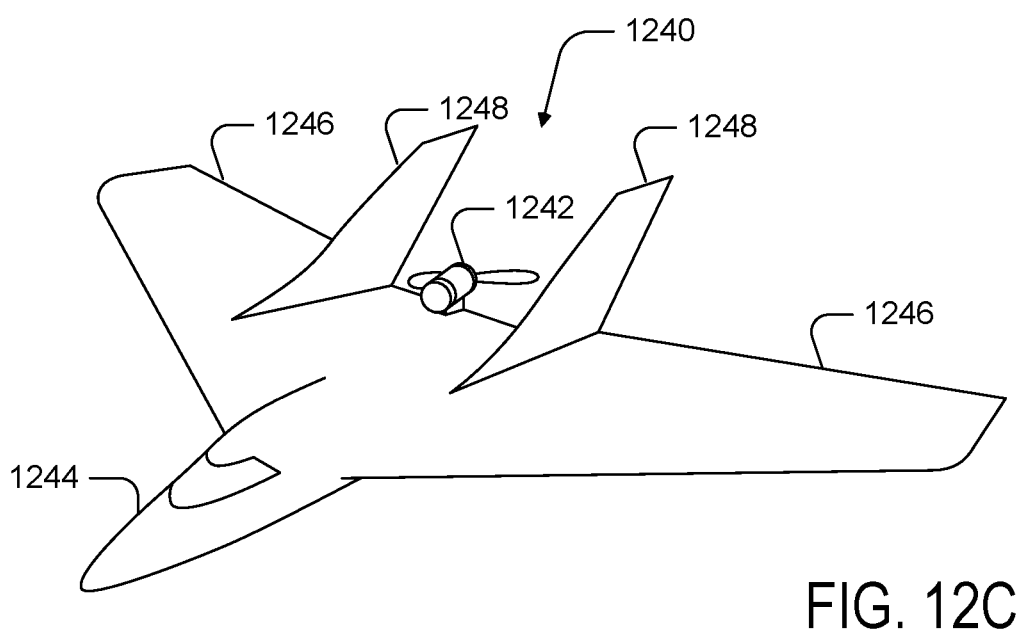
FIG. 12C is a simplified illustration of a UAV, according to an example embodiment.

FIG. 12C shows an example of a UAV 1240 with a propeller in a pusher configuration. The term "pusher" refers to the fact that a propulsion unit 1242 is mounted at the back of the UAV and "pushes" the vehicle forward, in contrast to the propulsion unit being mounted at the front of the UAV. Similar to the description provided for FIGS. 12A and 12B, FIG. 12C depicts common structures used in a pusher plane, including a fuselage 1244, two wings 1246, vertical stabilizers 1248, and the propulsion unit 1242, which can include a motor, shaft, and propeller.

Figure 12D:
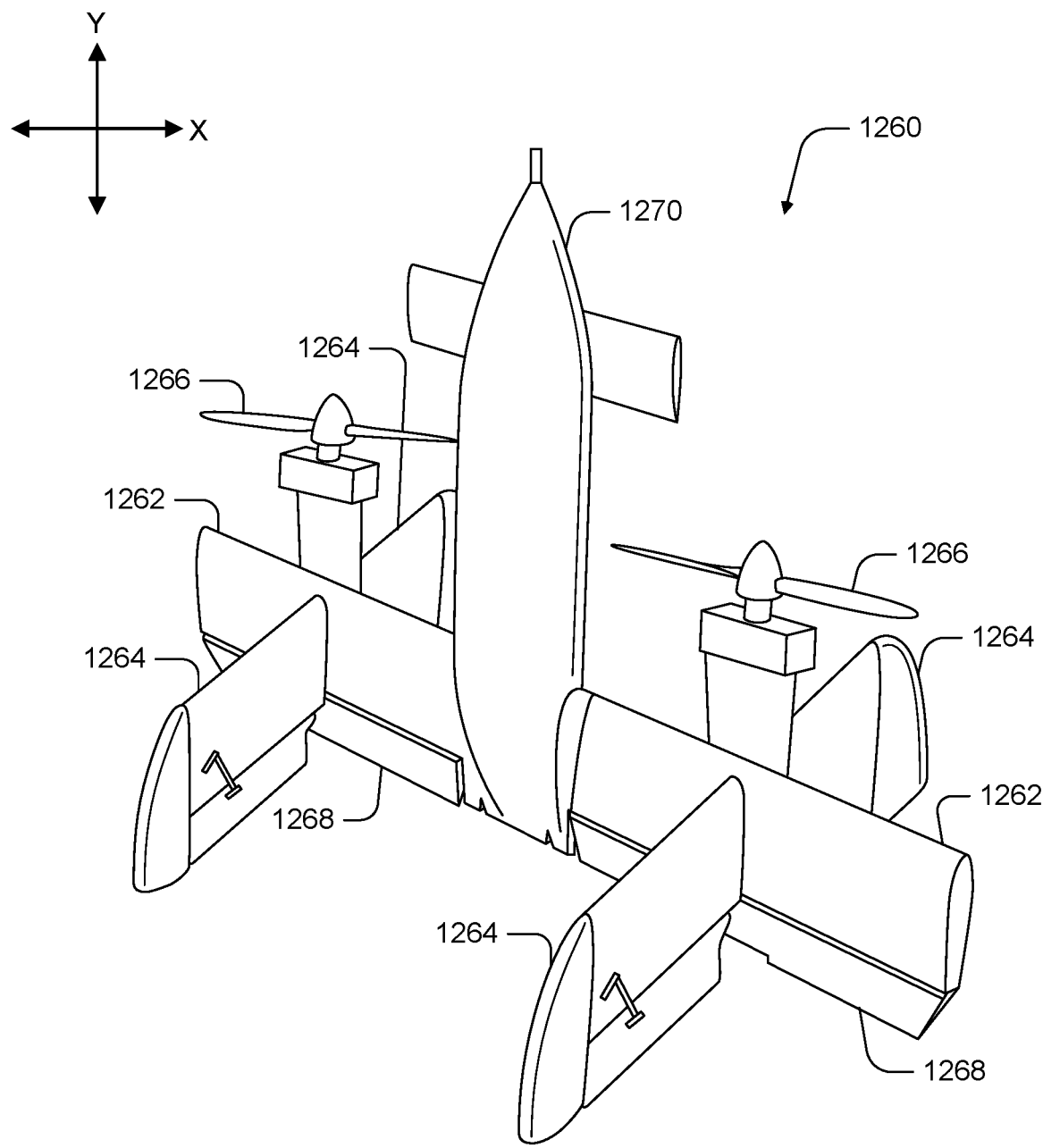
FIG. 12D is a simplified illustration of a UAV, according to an example embodiment.

FIG. 12D shows an example of a tail-sitter UAV 1260. In the illustrated example, the tail-sitter UAV 1260 has fixed wings 1262 to provide lift and allow the UAV 1260 to glide horizontally (e.g., along the x-axis, in a position that is approximately perpendicular to the position shown in FIG. 12D). However, the fixed wings 1262 also allow the tail-sitter UAV 1260 to take off and land vertically on its own.

For example, at a launch site, the tail-sitter UAV 1260 may be positioned vertically (as shown) with its fins 1264 and/or wings 1262 resting on the ground and stabilizing the UAV 1260 in the vertical position. The tail-sitter UAV 1260 may then take off by operating its propellers 1266 to generate an upward thrust (e.g., a thrust that is generally along the y-axis). Once at a suitable altitude, the tail-sitter UAV 1260 may use its flaps 1268 to reorient itself in a horizontal position, such that its fuselage 1270 is closer to being aligned with the x-axis than the y-axis. Positioned horizontally, the propellers 1266 may provide forward thrust so that the tail-sitter UAV 1260 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 12E:
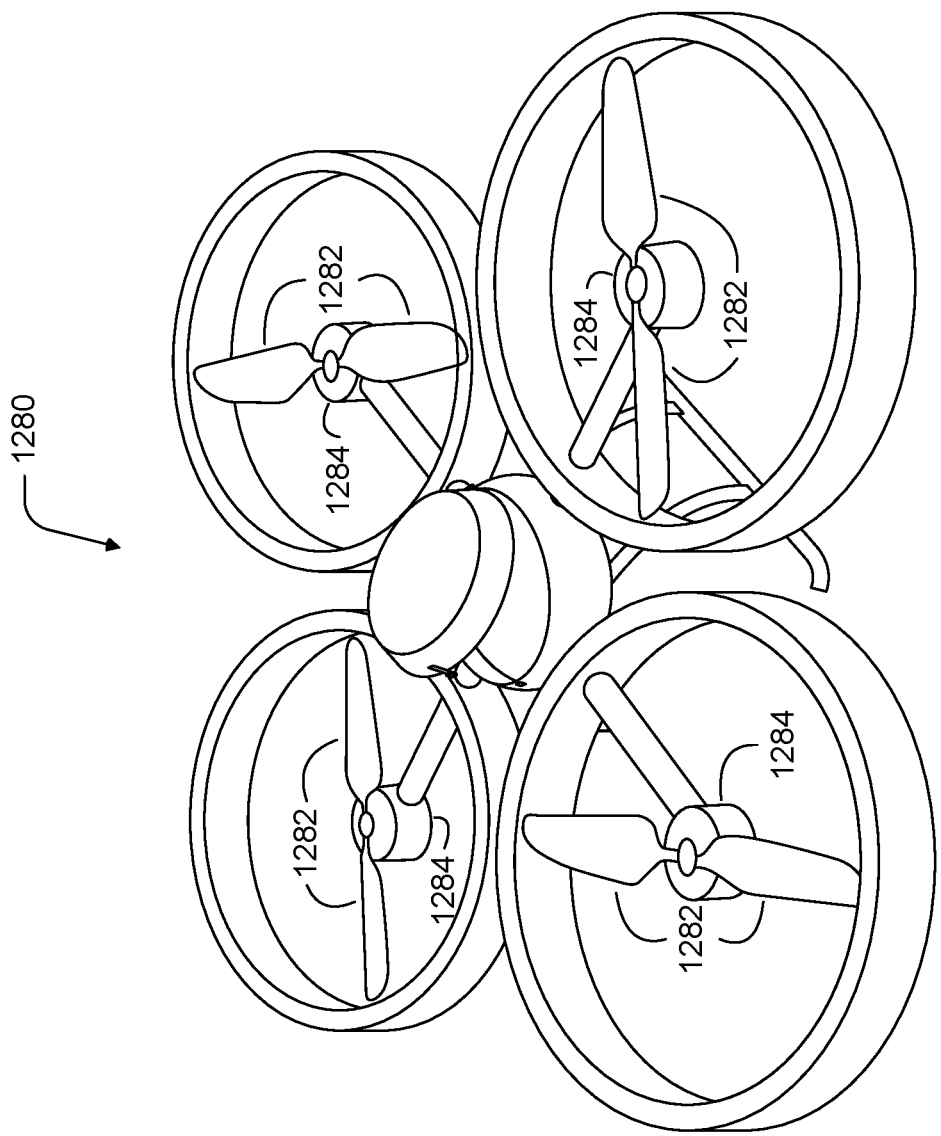
FIG. 12E is a simplified illustration of a UAV, according to an example embodiment.

As noted above, some embodiments may involve other types of UAVs, in addition to or in the alternative to fixed-wing UAVs. For instance, FIG. 12E shows an example of a rotorcraft that is commonly referred to as a multicopter 1280. The multicopter 1280 may also be referred to as a quadcopter, as it includes four rotors 1282. It should be understood that example embodiments may involve a rotorcraft with more or fewer rotors than the multicopter 1280. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 1280 in greater detail, the four rotors 1282 provide propulsion and maneuverability for the multicopter 1280. More specifically, each rotor 1282 includes blades that are attached to a motor 1284. Configured as such, the rotors 1282 may allow the multicopter 1280 to take off and land vertically, to maneuver in any direction, and/or to hover. Further, the pitch of the blades may be adjusted as a group and/or differentially, and may allow the multicopter 1280 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

VIII. Illustrative UAV Components

Figure 13:
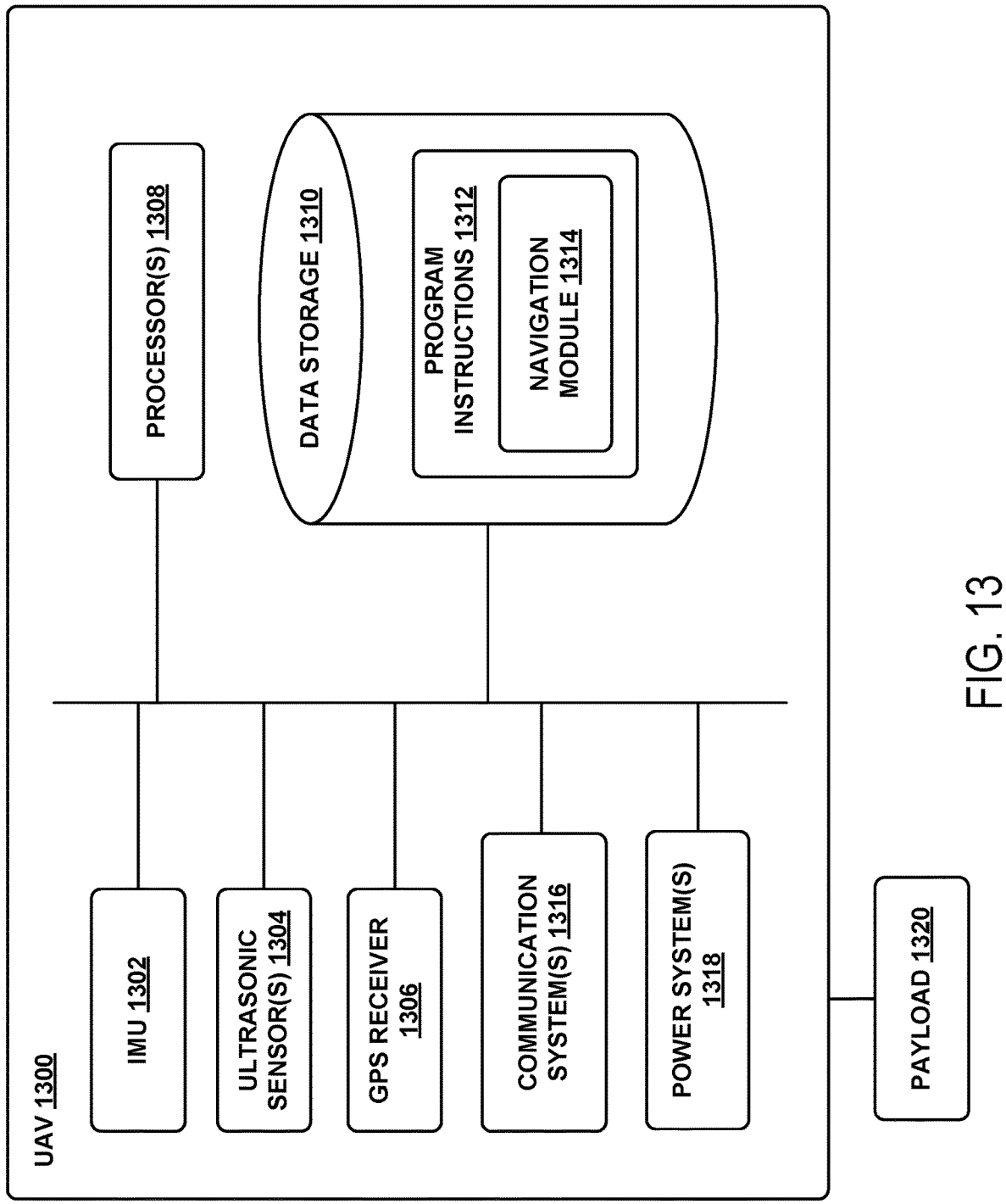
FIG. 13 is a simplified block diagram illustrating components of a UAV, according to an example embodiment.

FIG. 13 is a simplified block diagram illustrating components of a UAV 1300, according to an example embodiment. UAV 1300 may take the form of, or be similar in form to, one of the UAVs 1200, 1220, 1240, 1260, and 1280 described in reference to FIGS. 12A-12E. However, UAV 1300 may also take other forms.

UAV 1300 may include various types of sensors, and may include a computing system configured to provide the functionality described herein. In the illustrated embodiment, the sensors of UAV 1300 include an inertial measurement unit (IMU) 1302, ultrasonic sensor(s) 1304, and a GPS 1306, among other possible sensors and sensing systems.

In the illustrated embodiment, UAV 1300 also includes one or more processors 1308. A processor 1308 may be a general-purpose processor or a special purpose processor (e.g., digital signal processors, application specific integrated circuits, etc.). The one or more processors 1308 can be configured to execute computer-readable program instructions 1312 that are stored in the data storage 1310 and are executable to provide the functionality of a UAV described herein.

The data storage 1310 may include or take the form of one or more computer-readable storage media that can be read or accessed by at least one processor 1308. The one or more computer-readable storage media can include volatile and/or non-volatile storage components, such as optical, magnetic, organic or other memory or disc storage, which can be integrated in whole or in part with at least one of the one or more processors 1308. In some embodiments, the data storage 1310 can be implemented using a single physical device (e.g., one optical, magnetic, organic or other memory or disc storage unit), while in other embodiments, the data storage 1310 can be implemented using two or more physical devices.

As noted, the data storage 1310 can include computer-readable program instructions 1312 and perhaps additional data, such as diagnostic data of the UAV 1300. As such, the data storage 1310 may include program instructions 1312 to perform or facilitate some or all of the UAV functionality described herein. For instance, in the illustrated embodiment, program instructions 1312 include a navigation module 1314.

A. Sensors

In an illustrative embodiment, IMU 1302 may include both an accelerometer and a gyroscope, which may be used together to determine an orientation of the UAV 1300. In particular, the accelerometer can measure the orientation of the vehicle with respect to earth, while the gyroscope measures the rate of rotation around an axis. IMUs are commercially available in low-cost, low-power packages. For instance, an IMU 1302 may take the form of or include a miniaturized MicroElectroMechanical System (MEMS) or a NanoElectroMechanical System (NEMS). Other types of IMUs may also be utilized.

An IMU 1302 may include other sensors, in addition to accelerometers and gyroscopes, which may help to better determine position and/or help to increase autonomy of the UAV 1300. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 1300 may also include a pressure sensor or barometer, which can be used to determine the altitude of the UAV 1300. Alternatively, other sensors, such as sonic altimeters or radar altimeters, can be used to provide an indication of altitude, which may help to improve the accuracy of and/or prevent drift of an IMU.

In a further aspect, UAV 1300 may include one or more sensors that allow the UAV to sense objects in the environment. For instance, in the illustrated embodiment, UAV 1300 includes ultrasonic sensor(s) 1304. Ultrasonic sensor(s) 1304 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 1300 may also include one or more imaging system(s). For example, one or more still and/or video cameras may be utilized by UAV 1300 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 1300 may also include a GPS receiver 1306. The GPS receiver 1306 may be configured to provide data that is typical of well-known GPS systems, such as the GPS coordinates of the UAV 1300. Such GPS data may be utilized by the UAV 1300 for various functions. As such, the UAV may use its GPS receiver 1306 to help navigate to the caller's location, as indicated, at least in part, by the GPS coordinates provided by their mobile device. Other examples are also possible.

B. Navigation and Location Determination

The navigation module 1314 may provide functionality that allows the UAV 1300 to, e.g., move about its environment and reach a desired location. To do so, the navigation module 1314 may control the altitude and/or direction of flight by controlling the mechanical features of the UAV that affect flight (e.g., its rudder(s), elevator(s), aileron(s), and/or the speed of its propeller(s)).

In order to navigate the UAV 1300 to a target location, the navigation module 1314 may implement various navigation techniques, such as map-based navigation and localization-based navigation, for instance. With map-based navigation, the UAV 1300 may be provided with a map of its environment, which may then be used to navigate to a particular location on the map. With localization-based navigation, the UAV 1300 may be capable of navigating in an unknown environment using localization. Localization-based navigation may involve the UAV 1300 building its own map of its environment and calculating its position within the map and/or the position of objects in the environment. For example, as a UAV 1300 moves throughout its environment, the UAV 1300 may continuously use localization to update its map of the environment. This continuous mapping process may be referred to as simultaneous localization and mapping (SLAM). Other navigation techniques may also be utilized.

In some embodiments, the navigation module 1314 may navigate using a technique that relies on waypoints. In particular, waypoints are sets of coordinates that identify points in physical space. For instance, an air-navigation waypoint may be defined by a certain latitude, longitude, and altitude. Accordingly, navigation module 1314 may cause UAV 1300 to move from waypoint to waypoint, in order to ultimately travel to a final destination (e.g., a final waypoint in a sequence of waypoints).

In a further aspect, the navigation module 1314 and/or other components and systems of the UAV 1300 may be configured for "localization" to more precisely navigate to the scene of a target location. More specifically, it may be desirable in certain situations for a UAV to be within a threshold distance of the target location where a payload 1320 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 1300 may navigate to the general area of a target destination where a payload 1320 is being delivered using waypoints and/or map-based navigation. The UAV may then switch to a mode in which it utilizes a localization process to locate and travel to a more specific location. For instance, if the UAV 1300 is to deliver a payload to a user's home, the UAV 1300 may need to be substantially close to the target location in order to avoid delivery of the payload to undesired areas (e.g., onto a roof, into a pool, onto a neighbor's property, etc.). However, a GPS signal may only get the UAV 1300 so far (e.g., within a block of the user's home). A more precise location-determination technique may then be used to find the specific target location.

Various types of location-determination techniques may be used to accomplish localization of the target delivery location once the UAV 1300 has navigated to the general area of the target delivery location. For instance, the UAV 1300 may be equipped with one or more sensory systems, such as, for example, ultrasonic sensors 1304, infrared sensors (not shown), and/or other sensors, which may provide input that the navigation module 1314 utilizes to navigate autonomously or semi-autonomously to the specific target location.

As another example, once the UAV 1300 reaches the general area of the target delivery location (or of a moving subject such as a person or their mobile device), the UAV 1300 may switch to a "fly-by-wire" mode where it is controlled, at least in part, by a remote operator, who can navigate the UAV 1300 to the specific target location. To this end, sensory data from the UAV 1300 may be sent to the remote operator to assist them in navigating the UAV 1300 to the specific location.

As yet another example, the UAV 1300 may include a module that is able to signal to a passer-by for assistance in either reaching the specific target delivery location; for example, the UAV 1300 may display a visual message requesting such assistance in a graphic display, play an audio message or tone through speakers to indicate the need for such assistance, among other possibilities. Such a visual or audio message might indicate that assistance is needed in delivering the UAV 1300 to a particular person or a particular location, and might provide information to assist the passer-by in delivering the UAV 1300 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 1300 arrives at the general area of a target delivery location, the UAV 1300 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 1300 may be configured to navigate by "sourcing" such directional signals—in other words, by determining where the signal is strongest and navigating accordingly. As another example, a mobile device can emit a frequency, either in the human range or outside the human range, and the UAV 1300 can listen for that frequency and navigate accordingly. As a related example, if the UAV 1300 is listening for spoken commands, then the UAV 1300 could utilize spoken statements, such as "I'm over here!" to source the specific location of the person requesting delivery of a payload.

In an alternative arrangement, a navigation module may be implemented at a remote computing device, which communicates wirelessly with the UAV 1300. The remote computing device may receive data indicating the operational state of the UAV 1300, sensor data from the UAV 1300 that allows it to assess the environmental conditions being experienced by the UAV 1300, and/or location information for the UAV 1300. Provided with such information, the remote computing device may determine altitudinal and/or directional adjustments that should be made by the UAV 1300 and/or may determine how the UAV 1300 should adjust its mechanical features (e.g., its rudder(s), elevator(s), aileron(s), and/or the speed of its propeller(s)) in order to effectuate such movements. The remote computing system may then communicate such adjustments to the UAV 1300 so it can move in the determined manner.

C. Communication Systems

In a further aspect, the UAV 1300 includes one or more communication systems 1316. The communications systems 1316 may include one or more wireless interfaces and/or one or more wireline interfaces, which allow the UAV 1300 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 1300 may include communication systems 1316 that allow for both short-range communication and long-range communication. For example, the UAV 1300 may be configured for short-range communications using Bluetooth and for long-range communications under a CDMA protocol. In such an embodiment, the UAV 1300 may be configured to function as a "hot spot;" or in other words, as a gateway or proxy between a remote support device and one or more data networks, such as a cellular network and/or the Internet. Configured as such, the UAV 1300 may facilitate data communications that the remote support device would otherwise be unable to perform by itself For example, the UAV 1300 may provide a WiFi connection to a remote device, and serve as a proxy or gateway to a cellular service provider's data network, which the UAV might connect to under an LTE or a 3G protocol, for instance. The UAV 1300 could also serve as a proxy or gateway to a high-altitude balloon network, a satellite network, or a combination of these networks, among others, which a remote device might not be able to otherwise access.

D. Power Systems

In a further aspect, the UAV 1300 may include power system(s) 1318. The power system 1318 may include one or more batteries for providing power to the UAV 1300. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

The UAV 1300 may employ various systems and configurations in order to transport a payload 1320. In some implementations, the payload 1320 of a given UAV 1300 may include or take the form of a "package" designed to transport various goods to a target delivery location. For example, the UAV 1300 can include a compartment, in which an item or items may be transported. Such a package may one or more food items, purchased goods, medical items, or any other object(s) having a size and weight suitable to be transported between two locations by the UAV. In other embodiments, a payload 1320 may simply be the one or more items that are being delivered (e.g., without any package housing the items).

In some embodiments, the payload 1320 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when the payload 1320 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include a retractable delivery system that lowers the payload to the ground while the UAV hovers above. For instance, the UAV may include a tether that is coupled to the payload by a release mechanism. A winch can unwind and wind the tether to lower and raise the release mechanism. The release mechanism can be configured to secure the payload while being lowered from the UAV by the tether and release the payload upon reaching ground level. The release mechanism can then be retracted to the UAV by reeling in the tether using the winch.

In some implementations, the payload 1320 may be passively released once it is lowered to the ground. For example, a passive release mechanism may include one or more swing arms adapted to retract into and extend from a housing. An extended swing arm may form a hook on which the payload 1320 may be attached. Upon lowering the release mechanism and the payload 1320 to the ground via a tether, a gravitational force as well as a downward inertial force on the release mechanism may cause the payload 1320 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 1320 no longer forces the swing arm to extend from the housing. Retracting the swing arm into the housing may reduce the likelihood of the release mechanism snagging the payload 1320 or other nearby objects when raising the release mechanism toward the UAV upon delivery of the payload 1320.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 1300 could include an air-bag drop system or a parachute drop system. Alternatively, a UAV 1300 carrying a payload could simply land on the ground at a delivery location. Other examples are also possible.

IX. Illustrative UAV Deployment Systems

Figure 14:
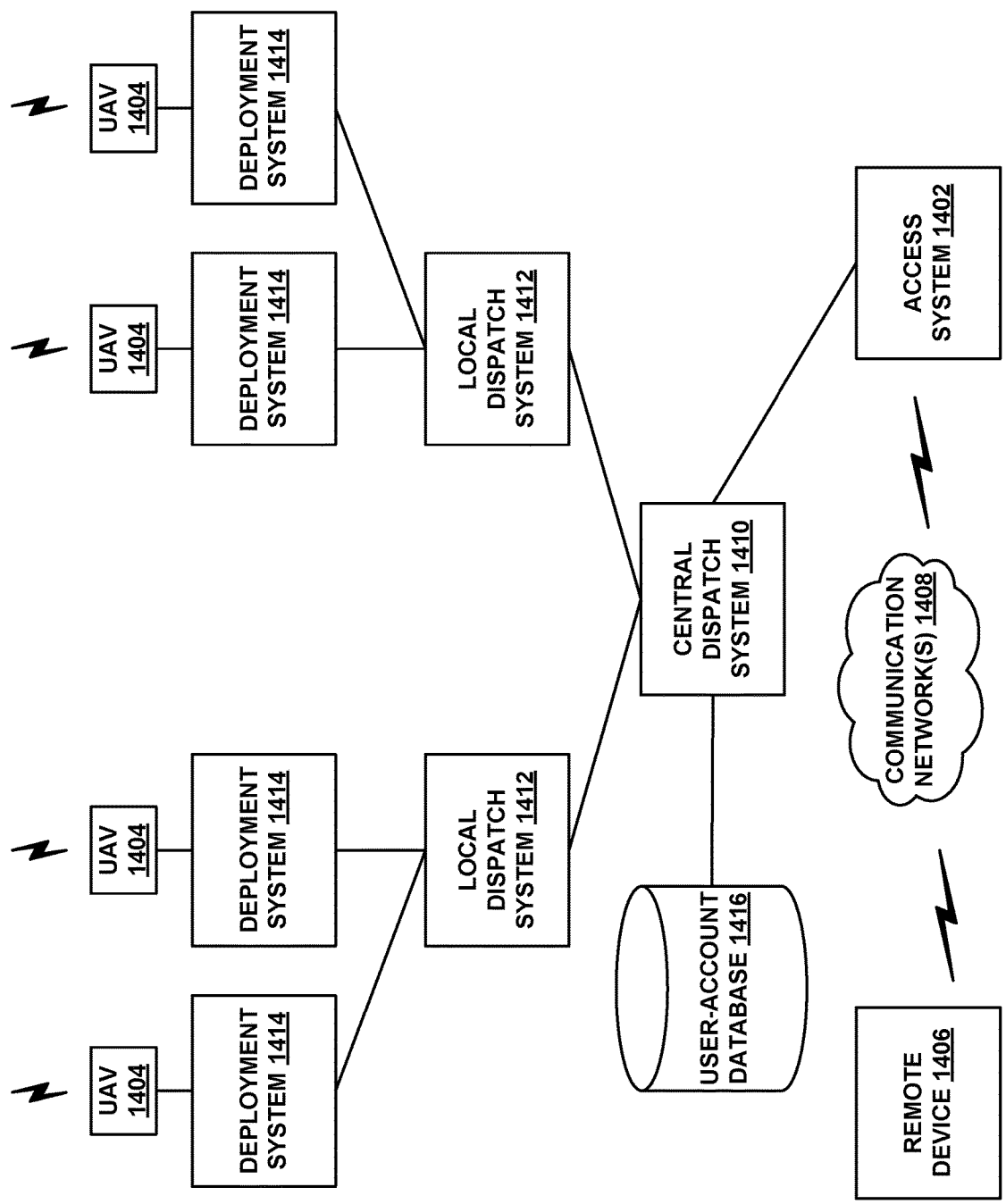
FIG. 14 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 14 is a simplified block diagram illustrating a distributed UAV system 1400, according to an example embodiment.

In the illustrative UAV system 1400, an access system 1402 may allow for interaction with, control of, and/or utilization of a network of UAVs 1404. In some embodiments, an access system 1402 may be a computing system that allows for human-controlled dispatch of UAVs 1404. As such, the control system may include or otherwise provide a user interface through which a user can access and/or control the UAVs 1404.

In some embodiments, dispatch of the UAVs 1404 may additionally or alternatively be accomplished via one or more automated processes. For instance, the access system 1402 may dispatch one of the UAVs 1404 to transport a payload to a target location, and the UAV may autonomously navigate to the target location by utilizing various on-board sensors, such as a GPS receiver and/or other various navigational sensors.

Further, the access system 1402 may provide for remote operation of a UAV. For instance, the access system 1402 may allow an operator to control the flight of a UAV via its user interface. As a specific example, an operator may use the access system 1402 to dispatch a UAV 1404 to a target location. The UAV 1404 may then autonomously navigate to the general area of the target location. At this point, the operator may use the access system 1402 to take control of the UAV 1404 and navigate the UAV to the target location (e.g., to a particular person to whom a payload is being transported). Other examples of remote operation of a UAV are also possible.

In an illustrative embodiment, the UAVs 1404 may take various forms. For example, each of the UAVs 1404 may be a UAV such as those illustrated in FIGS. 12A-12E. However, UAV system 1400 may also utilize other types of UAVs without departing from the scope of the invention. In some implementations, all of the UAVs 1404 may be of the same or a similar configuration. However, in other implementations, the UAVs 1404 may include a number of different types of UAVs. For instance, the UAVs 1404 may include a number of types of UAVs, with each type of UAV being configured for a different type or types of payload delivery capabilities.

The UAV system 1400 may further include a remote device 1406, which may take various forms. Generally, the remote device 1406 may be any device through which a direct or indirect request to dispatch a UAV can be made. (Note that an indirect request may involve any communication that may be responded to by dispatching a UAV, such as requesting a package delivery). In an example embodiment, the remote device 1406 may be a mobile phone, tablet computer, laptop computer, personal computer, or any network-connected computing device. Further, in some instances, the remote device 1406 may not be a computing device. As an example, a standard telephone, which allows for communication via plain old telephone service (POTS), may serve as the remote device 1406. Other types of remote devices are also possible.

Further, the remote device 1406 may be configured to communicate with access system 1402 via one or more types of communication network(s) 1408. For example, the remote device 1406 may communicate with the access system 1402 (or a human operator of the access system 1402) by communicating over a POTS network, a cellular network, and/or a data network such as the Internet. Other types of networks may also be utilized.

In some embodiments, the remote device 1406 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 1400 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 1410 may be a server or group of servers, which is configured to receive dispatch messages requests and/or dispatch instructions from the access system 1402. Such dispatch messages may request or instruct the central dispatch system 1410 to coordinate the deployment of UAVs to various target locations. The central dispatch system 1410 may be further configured to route such requests or instructions to one or more local dispatch systems 1412. To provide such functionality, the central dispatch system 1410 may communicate with the access system 1402 via a data network, such as the Internet or a private network that is established for communications between access systems and automated dispatch systems.

In the illustrated configuration, the central dispatch system 1410 may be configured to coordinate the dispatch of UAVs 1404 from a number of different local dispatch systems 1412. As such, the central dispatch system 1410 may keep track of which UAVs 1404 are located at which local dispatch systems 1412, which UAVs 1404 are currently available for deployment, and/or which services or operations each of the UAVs 1404 is configured for (in the event that a UAV fleet includes multiple types of UAVs configured for different services and/or operations). Additionally or alternatively, each local dispatch system 1412 may be configured to track which of its associated UAVs 1404 are currently available for deployment and/or are currently in the midst of item transport.

In some cases, when the central dispatch system 1410 receives a request for UAV-related service (e.g., transport of an item) from the access system 1402, the central dispatch system 1410 may select a specific UAV 1404 to dispatch. The central dispatch system 1410 may accordingly instruct the local dispatch system 1412 that is associated with the selected UAV to dispatch the selected UAV. The local dispatch system 1412 may then operate its associated deployment system 1414 to launch the selected UAV. In other cases, the central dispatch system 1410 may forward a request for a UAV-related service to a local dispatch system 1412 that is near the location where the support is requested and leave the selection of a particular UAV 1404 to the local dispatch system 1412.

In an example configuration, the local dispatch system 1412 may be implemented as a computing system at the same location as the deployment system(s) 1414 that it controls. For example, the local dispatch system 1412 may be implemented by a computing system installed at a building, such as a warehouse, where the deployment system(s) 1414 and UAV(s) 1404 that are associated with the particular local dispatch system 1412 are also located. In other embodiments, the local dispatch system 1412 may be implemented at a location that is remote to its associated deployment system(s) 1414 and UAV(s) 1404.

Numerous variations on and alternatives to the illustrated configuration of the UAV system 1400 are possible. For example, in some embodiments, a user of the remote device 1406 could request delivery of a package directly from the central dispatch system 1410. To do so, an application may be implemented on the remote device 1406 that allows the user to provide information regarding a requested delivery, and generate and send a data message to request that the UAV system 1400 provide the delivery. In such an embodiment, the central dispatch system 1410 may include automated functionality to handle requests that are generated by such an application, evaluate such requests, and, if appropriate, coordinate with an appropriate local dispatch system 1412 to deploy a UAV.

Further, some or all of the functionality that is attributed herein to the central dispatch system 1410, the local dispatch system(s) 1412, the access system 1402, and/or the deployment system(s) 1414 may be combined in a single system, implemented in a more complex system, and/or redistributed among the central dispatch system 1410, the local dispatch system(s) 1412, the access system 1402, and/or the deployment system(s) 1414 in various ways.

Yet further, while each local dispatch system 1412 is shown as having two associated deployment systems 1414, a given local dispatch system 1412 may alternatively have more or fewer associated deployment systems 1414. Similarly, while the central dispatch system 1410 is shown as being in communication with two local dispatch systems 1412, the central dispatch system 1410 may alternatively be in communication with more or fewer local dispatch systems 1412.

In a further aspect, the deployment systems 1414 may take various forms. In general, the deployment systems 1414 may take the form of or include systems for physically launching one or more of the UAVs 1404. Such launch systems may include features that provide for an automated UAV launch and/or features that allow for a human-assisted UAV launch. Further, the deployment systems 1414 may each be configured to launch one particular UAV 1404, or to launch multiple UAVs 1404.

The deployment systems 1414 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 1414 and their corresponding UAVs 1404 (and possibly associated local dispatch systems 1412) may be strategically distributed throughout an area such as a city. For example, the deployment systems 1414 may be strategically distributed such that each deployment system 1414 is proximate to one or more payload pickup locations (e.g., near a restaurant, store, or warehouse). However, the deployment systems 1414 (and possibly the local dispatch systems 1412) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 1400 may include or have access to a user-account database 1416. The user-account database 1416 may include data for a number of user accounts, and which are each associated with one or more person. For a given user account, the user-account database 1416 may include data related to or useful in providing UAV-related services. Typically, the user data associated with each user account is optionally provided by an associated user and/or is collected with the associated user's permission.

Further, in some embodiments, a person may be required to register for a user account with the UAV system 1400, if they wish to be provided with UAV-related services by the UAVs 1404 from UAV system 1400. As such, the user-account database 1416 may include authorization information for a given user account (e.g., a username and password), and/or other information that may be used to authorize access to a user account.

In some embodiments, a person may associate one or more of their devices with their user account, such that they can access the services of UAV system 1400. For example, when a person uses an associated mobile phone to, e.g., place a call to an operator of the access system 1402 or send a message requesting a UAV-related service to a dispatch system, the phone may be identified via a unique device identification number, and the call or message may then be attributed to the associated user account. Other examples are also possible.

X. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

We claim:

1. A landing structure comprising:
   a landing platform for an unmanned aerial vehicle (UAV), wherein the UAV comprises a boom with a first landing pad, a second landing pad, and a winch system comprising a tether coupleable to a payload;
   a cavity within the landing platform, wherein the cavity is aligned over a predetermined target location and is sized to allow the winch system to pass a tethered payload through the cavity; and
   a track that runs along the landing platform and along at least a portion of the cavity such that the track guides the UAV to a docked position while the UAV travels along the landing platform under power from the UAV, wherein when in the docked position the tether is positioned over the cavity, such that the tether can raise or lower a payload through the cavity;
   wherein the track comprises a slot in the landing platform, wherein the first landing pad and the second landing pad of the UAV each have a pin that extends beyond the pad such that when the UAV moves along the landing platform the pin in the first landing pad will engage the slot, then the second pin will engage the slot so as the UAV continues to move along the landing platform the UAV will follow a path of the slot to the docked position over the cavity.

2. The landing structure of claim 1, further comprising:
   at least one stop block near the cavity, wherein the at least one stop block prevents the UAV from traveling beyond the cavity.

3. The landing structure of claim 1, further comprising:
   at least one stop block near the cavity, wherein the at least one stop block prevents the UAV from traveling vertically.

4. The landing structure of claim 1, wherein the track comprises:
   a straight portion of track along the landing platform;
   a tapered portion of track, wherein the tapered portion of track begins at the straight portion of track and tapers out to edges of the cavity; and
   a cavity portion of track, wherein the cavity portion of track runs alongside at least part of the cavity.

5. The landing structure of claim 1, wherein the tether is coupled to a payload coupling apparatus at a first end and the winch system at a second end.

6. The landing structure of claim 1, wherein the landing platform is attached to an exterior wall of a building.

7. The landing structure of claim 1, wherein the landing platform is integrated into an awning attached to a building.

8. The landing structure of claim 1, wherein the landing platform is attached to another vehicle.

9. The landing structure of claim 1, wherein the cavity is large enough for at least two UAVs positioned over the cavity at a same time.

10. The landing structure of claim 1, further comprising:
    a plurality of mechanical restraints that maintain the UAV in the docked position over the cavity of the landing platform.

11. The landing structure of claim 1, wherein the landing platform is at least nine feet above a ground surface.

12. The landing structure of claim 1, wherein the UAV comprises a propulsion unit and the UAV travels along the landing platform using the propulsion unit.

13. The landing structure of claim 1, further comprising:
    a vertical support structure coupled to the bottom of the landing platform, wherein the vertical support structure comprises a payload platform located below the cavity.

14. The landing structure of claim 13, wherein the payload platform comprises an elevator platform that travels between a ground level and a loading level, wherein the payload is secured to the UAV at the loading level and is loaded or unloaded by a user at the ground level.

15. A system comprising:
    an unmanned aerial vehicle (UAV) comprising a winch system and a boom, wherein the winch system comprises a tether coupleable to a payload, and further wherein the boom comprises a first pin and a second pin, wherein the first pin and the second pin each extend outwards from the boom; and
    a landing platform comprising:
        a cavity that is aligned over a predetermined target location and is sized to allow the winch system to pass a tethered payload through the cavity; and
        a slot that runs along the landing platform and along at least a portion of the cavity such that when the UAV moves along the landing platform the first pin will engage the slot and then the second pin will engage the slot, so as the UAV continues to move along the landing platform the UAV will follow a path of the slot to the docked position over the cavity, and wherein when in the docked position the tether is positioned over the cavity, such that the tether can raise or lower the payload through the cavity.

16. The system of claim 15, wherein landing gear of the UAV comprises the first pin and the second pin of the boom of the UAV, the system further comprising:
a control system configured to:
instruct the UAV to apply a forward thrust such that at least a portion of the landing gear of the UAV contacts the slot; and
instruct the UAV to continue to apply the forward thrust until the UAV reaches the docked position.

17. The system of claim 15, further comprising:
a control system configured to:
determine if the UAV has reached the docked position; and
based on the determination that the UAV has reached the docked position, activate the winch system to lower the tether through the cavity.

18. The system of claim 15, further comprising:
a control system configured to:
determine that the tether has coupled to the payload or that the tether has decoupled from the payload; and
based on the determination that the tether has coupled to the payload or that the tether has decoupled from the payload, activate the winch system to raise the tether through the cavity.

19. The system of claim 15, further comprising:
a vertical support structure coupled to the bottom of the landing platform; and
a payload platform movably coupled to the vertical support structure such that the payload platform travels vertically between a ground level and a loading level, wherein the payload platform is located below the cavity of the landing platform, and wherein the payload is secured to the UAV at the loading level and is loaded or unloaded by a user at the ground level.

20. The system of claim 15, further comprising:
at least one stop block, wherein the at least one stop block prevents the UAV from traveling beyond the cavity.

21. The system of claim 15, wherein the slot comprises:
a straight portion of the slot along the landing platform;
a tapered portion of the slot, wherein the tapered portion of the slot begins at the straight portion of the slot and tapers out to edges of the cavity; and
a cavity portion of the slot, wherein the cavity portion of the slot runs alongside at least part of the cavity.

22. The system of claim 15, wherein the landing platform further comprises:
a navigational aid, wherein the navigational aid is configured to transmit a signal to the UAV.

23. The system of claim 15, wherein the landing platform is coupled to an exterior wall of a building.

24. The system of claim 15, wherein the landing platform is located at least nine feet about a ground surface.

25. A method comprising:
landing, by an unmanned aerial vehicle (UAV), on a landing platform, wherein the UAV comprises a winch system and a boom, wherein the winch system comprises a tether coupleable to a payload, and further wherein the boom comprises a first landing pad with a first pin and a second landing pad with a second pin, wherein the first pin and the second pin each extend beyond the respective landing pad;
engaging, by the first pin and then the second pin of the boom of the UAV, a slot that runs along the landing platform and along at least a portion of a cavity of the landing platform, wherein the cavity is aligned over a predetermined target location and is sized to allow the winch system to pass a tethered payload through the cavity;
guiding the UAV along a path of the slot to a docked position in which the tether is positioned over the cavity, wherein the UAV is guided along a path of the slot while under power from the UAV; and
loading or unloading, by the tether, a payload to or from the UAV through the cavity when the UAV is in the docked position.

26. The method of claim 25, further comprising:
lowering, by the winch system, a payload coupling apparatus to secure the payload, wherein the payload coupling apparatus is coupled to a first end of the tether and the winch system is coupled to a second end of the tether.

27. A landing structure, comprising:
a landing platform for an unmanned aerial vehicle (UAV), wherein the UAV comprises a winch system and a boom, and wherein the winch system comprises a tether coupleable to a payload, and further wherein the boom comprises a first landing pad with a first pin and a second landing pad with a second pin, wherein the first pin and the second pin each extend beyond the respective landing pad;
a cavity within the landing platform, wherein the cavity is aligned over a predetermined target location and is sized to allow the winch system to pass a tethered payload through the cavity; and
a track that runs along the landing platform and along at least a portion of the cavity such that the track guides the UAV to a docked position, wherein the track comprises a slot in the landing platform such that when the UAV moves along the landing platform the first pin of the first landing pad will engage the slot and then the second pin of the second landing pad will engage the slot, so as the UAV continues to move along the landing platform the UAV will follow a path of the slot to the docked position over the cavity, and when in the docked position the tether of the UAV is positioned over the cavity so the tether can raise or lower a payload through the cavity.

* * * * *